(12) United States Patent  (10) Patent No.: US 8,751,035 B2
Janét  (45) Date of Patent: Jun. 10, 2014

(54) AUTOMATED LAUNDRY DROP-OFF AND RETRIEVAL SYSTEM

(75) Inventor: Jason André Janét, Raleigh, NC (US)

(73) Assignee: Jason André Janét, Raleigh, NC (US)

( * ) Notice: Subject to any disclaimer, the term of this patent is extended or adjusted under 35 U.S.C. 154(b) by 99 days.

(21) Appl. No.: 13/591,950

(22) Filed: Aug. 22, 2012

(65) Prior Publication Data

US 2014/0058554 A1 Feb. 27, 2014

(51) Int. Cl.
*G06F 7/00* (2006.01)

(52) U.S. Cl.
USPC ........... 700/214; 700/213; 700/216; 700/217; 700/219; 700/221; 700/229; 700/230; 700/231; 700/232

(58) Field of Classification Search
None
See application file for complete search history.

(56) References Cited

U.S. PATENT DOCUMENTS

| 4,971,244 | A | 11/1990 | Friedman |
| 5,431,493 | A | 7/1995 | Larson |
| 5,774,053 | A | 6/1998 | Porter |
| 5,829,349 | A | 11/1998 | Fitzgerald et al. |
| 6,330,856 | B1 | 12/2001 | Fitzgerald et al. |
| 6,360,867 | B1 | 3/2002 | Ford |
| 6,502,718 | B2 | 1/2003 | Fitzgerald et al. |
| 7,731,012 | B2 | 6/2010 | Santicchi |
| 7,837,424 | B2 | 11/2010 | Solomon |
| 7,850,411 | B2 | 12/2010 | Solomon |
| 7,913,898 | B2 | 3/2011 | Frankenberg et al. |
| 7,988,245 | B2 | 8/2011 | Machala et al. |
| 2003/0074105 | A1* | 4/2003 | Capps et al. ................ 700/225 |
| 2004/0267402 | A1* | 12/2004 | Speckhart et al. ............ 700/213 |
| 2007/0261997 | A1* | 11/2007 | Cassady et al. ................ 209/3.3 |

FOREIGN PATENT DOCUMENTS

WO 02/07119 A1 1/2002

* cited by examiner

*Primary Examiner* — Yolanda Cumbess
(74) *Attorney, Agent, or Firm* — Murphy, Bilak & Homiller, PLLC

(57) ABSTRACT

A storage unit for the drop-off, delivery, and pick-up of personal garments includes a plurality of apparel totes, each sized to enclose a plurality of apparel items on hangers, each including a machine-readable medium carrying a tote identifier code, and each configured with an access panel to allow deposit and retrieval of apparel items on hangers. A multi-layer conveyor system selectively moves apparel totes to and from a pre-defined customer access position and to and from a plurality of storage positions on each of at least two horizontal storage layers.

14 Claims, 11 Drawing Sheets

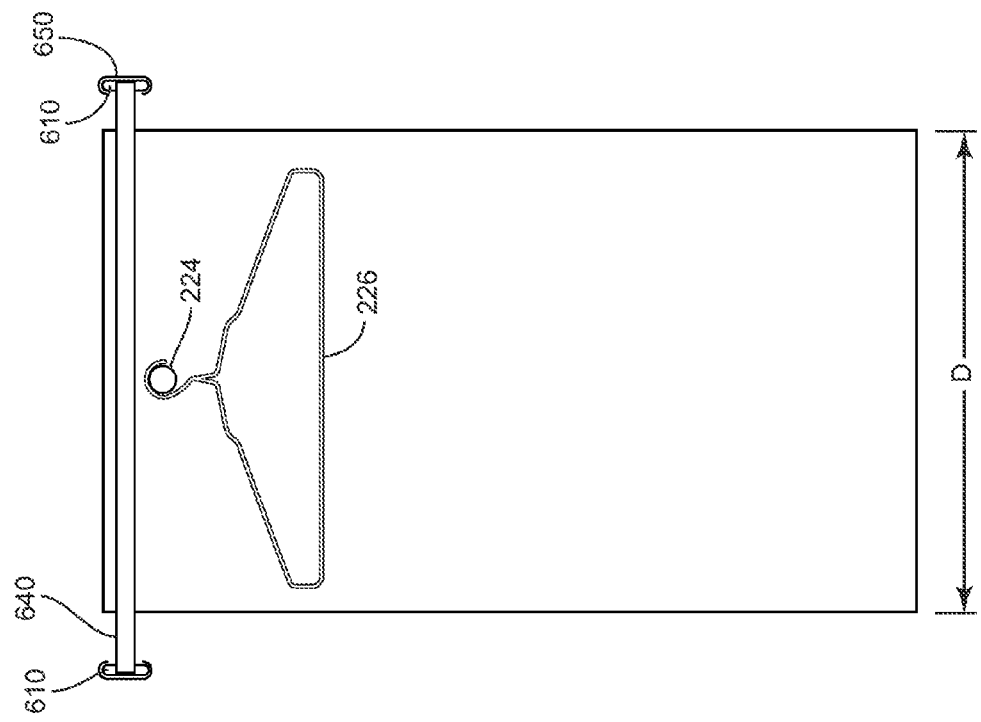
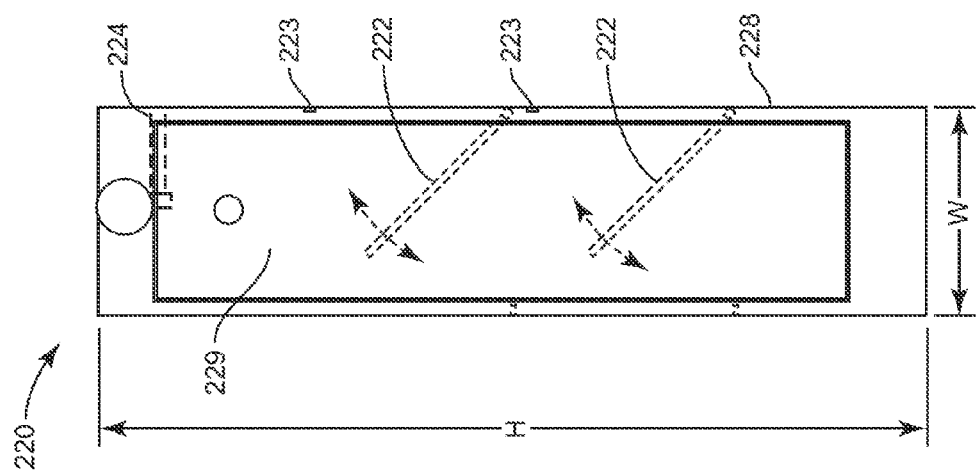

AUTOMATED LAUNDRY DROP-OFF AND RETRIEVAL SYSTEM

BACKGROUND

The present invention generally relates to a storage system for the pickup and delivery of goods, and particularly relates to an automated storage device for the pickup and delivery of clothing.

Most communities in America offer at least one laundry service provider (LSP). The LSP provides an important service by performing garment maintenance and modification for consumers who may not have the skills, time, interest or resources to do themselves. LSP services typically include dry cleaning, wash-and-fold, and tailoring.

From all considerations, market research indicates that convenience is the most important factor driving the selection of an LSP. Other factors include performance, ratings, security, cost, environmental impact and health safety. But, convenience generally ranks highest.

Convenience is usually defined by proximity to a consumer's home, work, frequently-visited retail establishment, and/or frequently traveled routes. However, convenience may also be defined by an LSP's hours of operation, the existence of a drive-thru, or access to eco- and health-friendly services. For example, consumers who work atypical hours will prefer an LSP that has extended hours, even if other LSPs are closer. Likewise, a stay-at-home parent may consider a distant LSP with a drive-thru more convenient than a geographically closer LSP, because he/she could drop off and pick up the family's garments without disrupting the seated children. Finally, because few LSPs offer an alternative to using carcinogenic and environmentally-hazardous chemicals, consumers who seek one are forced to drive farther, which paradoxically, only contributes to environmental damage.

Because convenience is so important, LSPs make special efforts to reach out to consumers and grow their client base. Efforts include providing mobile pick-up and delivery (courier) services, as well as establishing geographically-distributed drop-off facilities. Although there is clearly a strong market for LSPs, consumers are not currently receiving optimal convenience at a fair price. Moreover, LSPs' efforts to expand convenience have had an increasingly harmful effect on the environment. The accrued cost to the environment is exponential and will ultimately be borne by all citizens, even those that do not use an LSP.

LSPs primarily offer two means of collecting the garments, which are summarized below.

Pick-Up and Delivery Courier—

As LSPs seek to expand a client base, they may purchase a vehicle and employ a driver/courier to visit consumers' homes or places of work to pick up and deliver garments. If the courier is visiting the consumer's home, it is typically required that the laundry be stowed in a garment bag, which is often a bright or prominent color, and left in an easily accessible place on the exterior of the house. Consumers are often charged a premium for courier services, which can be a significant deterrent to the take-up of these services. Further, courier services also expose LSPs and drivers to significant liability, be it for lost, stolen and damaged garments, or the physical safety of drivers and residents. Because LSP couriers are typically not certified and not specially trained (unlike USPS, FedEx and UPS drivers) there is a potential safety risk for consumers and their property.

Drop-Off Facilities—

Drop-off facilities are typically retail buildings comprising 1,000 to 3,000 square-feet of floor space, one or more laborers, storage racks, automated conveyor, storage bins, a point-of-sale computer system, an operation management software system, evaluation and/or preparation benches, and climate control systems. A drop-off facility provides the consumer with a retail location associated with a specific processing plant, but in relatively close proximity to his/her home, work or normal travel patterns. When a consumer enters a drop-off facility, he or she is greeted by the laborer(s) that log the garments, enter the consumer's contact information, note any special requests, provide an estimated time for pick-up, and hand the consumer a claim ticket. Laborer(s) then carry the garments from the customer counter to an evaluation/preparation station where each garment is checked for an identification label (e.g., a barcode, tag or RFID); if a label does not exist, one may be applied. Laborers at drop-off facilities may also inspect each garment for stains or material failures that require special attention. (If this inspection is not performed at the drop-off facility, it is performed at the laundry plant.) Finally, a courier visits the drop-off facility, collects all received garments, and transports them to the plant.

From a business perspective, courier and drop-off services must operate within a cost-effective and time-effective range with respect to the plant that actually performs the cleaning, folding, hanging and/or tailoring tasks. A plant may operate as a hub or central-processing station, supporting its local client base, several drop-off facilities and/or couriers up to a capacity limited by equipment and labor. Rarely do plants operate at full capacity without offering courier or drop-off services; most operate at 20%-30% if they cater to only one geographical area.

LSPs modulate their hours of operation by balancing required throughput, client patterns and costs. As an example, if a significant majority of clients require service between 7 AM and 7 PM, and all garment handling tasks are on schedule (i.e., there is no backlog), then a store, plant or courier will only operate between 7 AM and 7 PM. Even if some clients prefer or need after-hours service, the costs to employ staff and equipment may compromise profits.

LSPs assume other risks when they invest in drop-off or courier services. Despite demographics or psychographics, client volumes may not live up to predictions. Retail building leases and up-fits can legally bind a business to an unprofitable operation for several years, depending on lease terms, environmental impact laws, permits and general lack of equipment portability.

SUMMARY

Described in detail below are several embodiments of a storage unit for the drop-off, delivery, and pick-up of personal garments. Several of these embodiments include a plurality of apparel totes, each sized to enclose a plurality of apparel items on hangers, each including a machine-readable medium carrying a tote identifier code, and each configured with an access panel to allow deposit and retrieval of apparel items on hangers. These embodiments further include a multi-layer conveyor system configured to selectively move apparel totes to and from a pre-defined customer access position and to and from a plurality of storage positions on each of at least two substantially horizontal storage layers.

Several embodiments of the storage unit include a housing, which contains the multi-layer conveyor system and the plurality of apparel totes, and which includes a tote access mechanism. The tote access mechanism is proximate to the pre-defined customer access position and is configured to securely retain the apparel totes within the housing while allowing customer access from outside the housing to contents of a single one of the apparel totes at a time. The storage unit in these embodiments further includes a human-interface system accessible from outside the housing. The human-interface includes at least one input device configured to receive customer input and at least one output device configured to provide transaction feedback.

The storage unit still further includes a sensor device configured to read the tote identifier code from the machine-readable medium for each apparel tote, and a control processor disposed within the housing, operatively connected to the human-interface system to collect the customer input and to produce the transaction feedback, and operatively connected to the sensor device to collect the tote identifier codes. The control processor is configured to track the position of each apparel tote based on the identifier codes and to control the multi-layer conveyor system responsive to the customer input.

In some systems, the human interface system comprises an audio recording device configured to record voice messages from a customer or an audio/video recording device configured to record audio/video messages from a customer. Some of these systems may further include a communications interface circuit operably connected to the control processor, where the control processor is configured to transmit at least a portion of the customer input to a remote station via the communications interface circuit. In some cases, the control processor and the communications interface circuit are configured to provide a real-time, two-way audio connection to the remote station via the communications interface circuit, responsive to the customer input.

In some embodiments, the conveyor system is expandable in the horizontal direction. These embodiments include two separable sections disposed side-by-side one another, wherein the two separable sections are each configured, when separated, to connect to a third separable section disposed between the two separable sections for adding additional storage positions on each of the first and second layers. In other embodiments, the conveyor system is expandable in the vertical direction, and includes a first separable section connected to and disposed above a second separable section, wherein the first and second sections are each configured, when separated, to connect to a third separable section disposed between the two separable sections for adding a third layer of storage positions. Some embodiments may be expandable in both the horizontal and vertical dimensions.

In some of the storage units, a single motor is configured to simultaneously drive horizontal tote propulsion means for each of the first and second layers and to simultaneously drive a first vertical tote propulsion means conveying totes from the first layer to the second layer and a second vertical tote propulsion means conveying totes from the second layer to the first layer. In some cases, the single motor is coupled to the horizontal tote propulsion means at a first gearing ratio so as to move totes horizontally at a first speed and coupled to the first and second vertical tote propulsion means at a second gearing ratio so as to move totes vertically at a second speed, wherein the ratio of the second speed to the first speed exceeds the ratio between each tote's dimensions in the directions of vertical and horizontal motion, respectively.

As noted above, the totes in some embodiments of the present invention include a machine-readable medium. This machine-readable medium may be a printed bar-code on an external surface of the apparel tote, in some embodiments, or an RFID chip secured to or embedded within the apparel tote, or a unique image disposed on an external surface of the apparel tote, or a radio-linked microprocessor circuit, or one or more electrical contacts accessible from the exterior of the apparel tote and electrically connected to a processor or a mechanically configurable electrical switch or an electrically programmable memory device. Combinations of these technologies may be used, in some embodiments.

Each apparel tote in the storage units summarized above has a height, width, and depth, the width corresponding to a horizontal direction of motion in the multi-layer conveyor system. In some cases, a storage unit may include totes having two or more different widths. In some cases, the totes each include a compliant interface component for engaging the conveyor system, to prevent binding or jamming in the system. Examples of this compliant interface component include: a high-friction surface disposed on the apparel tote to engage belts on the conveyor system; a clutch-enabled sprocket for engaging a chain drive on the conveyor system; a clutch-enabled gear for engaging a screw drive on the conveyor system; and a plurality of rolling rods disposed on the apparel tote to engage belts on the conveyor.

The apparel totes in some units may include a power interface to couple electrical power supplied from the exterior of the apparel totes to one or more electrical components secured within or embedded within the apparel tote. These electrical components may include, for example: a ventilation fan; a cooling system; a heating system; a contents-detection device; one or more environmental sensor devices; and a programmable memory system.

Embodiments of the present invention are not limited to those summarized above, and further variations are described in detail below. Accordingly, those skilled in the art will recognize additional features and advantages upon reading the following detailed description, and upon viewing the accompanying drawings.

BRIEF DESCRIPTION OF THE DRAWINGS

FIGS. 6A and 6B illustrate details of an example apparel tote.

DETAILED DESCRIPTION

Generally speaking, there is a void in the Laundry Service Provider (LSP) market that simultaneously impacts consumers, LSPs, and the environment. Driving long distances in search of convenience or eco-friendly services costs the consumer, both in dollars and time. However, LSPs cannot establish enough traditional drop-off facilities or courier services without assuming significant financial risk or increasing prices which compromise competitiveness. The environment suffers largely due to the extra miles consumers and couriers must travel to overcome inconveniences in all their forms, but also from the lack of easy access to eco- and health-friendly LSPs.

It is clear that this market would benefit significantly from a low-cost, small footprint, and automated system that receives and dispenses garments at any hour of the day, supports walk-up or drive-through clients, and simultaneously interfaces consumers, LSPs and point-of-sale systems. If the automated system is portable and reconfigurable, LSPs could be easily positioned at various locations that optimize profits and minimize consumer costs. Because small-footprint, portable systems can be readily placed in frequented locations (grocery stores, pharmacies, department stores, parking lots, workplace, etc.), consumers and couriers will minimize their travel to drop off and pick up garments. Finally, a system that enables consumers to choose their LSP, regardless of geographical proximity, can reduce the use of and exposure to carcinogenic chemicals.

To address several of these concerns, various aspects of the present invention are described herein in the context of a Laundry Automated Storage and Retrieval System ("Laundry ASRS" or "LASRS"), which in several embodiments is a uniquely convenient, cost-effective, modular, environmentally-friendly and consumer-centric system that receives, stores, and dispenses garments.

Figure 1:
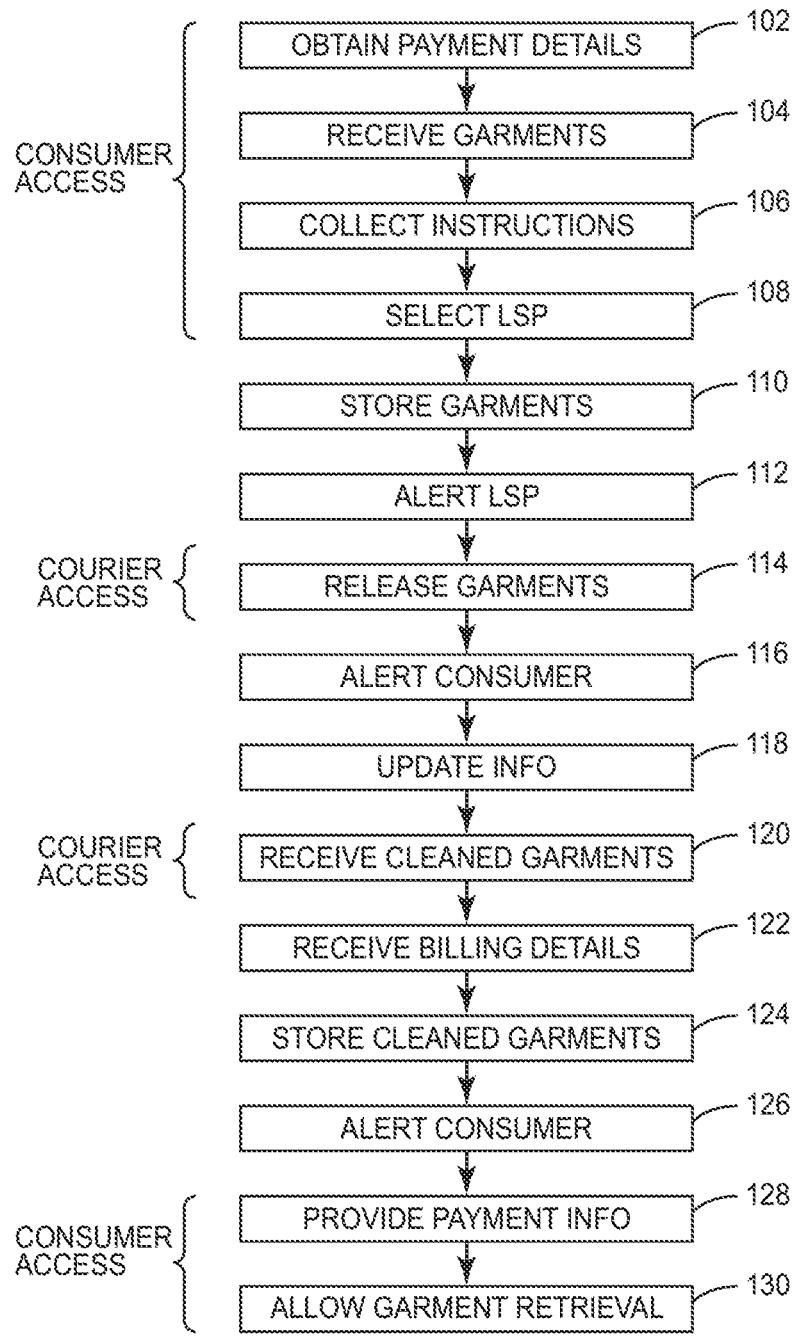
FIG. 1 illustrates steps of an example transaction carried out at a Laundry Automated Storage and Retrieval System (LASRS).

Certain aspects of the LASRS are best understood by reference to a typical LSP transaction. FIG. 1 illustrates the steps of an example transaction that may be carried out completely or primarily by and/or using the LASRS. Of course, several of these steps may be performed in an order different from that illustrated, and certain steps may be omitted entirely by some systems. Referring to FIG. 1, the illustrated steps include:

Step 102: Obtain credentials and secure payment from the consumer (e.g., by recording credit card details and/or identifying a pre-existing customer account). For example, during this initial stage, the consumer may be prompted to insert a credit card to identify the customer and/or obtain payment information. If the customer is on record from previous transactions, no additional information is needed before moving on to the next step. However, if the customer is new, or if any contact information has changed, he/she is prompted to enter address, phone, SMS and/or email data. Passwords may or may not be used, depending on the sensitivity of the collected information, for example.

Step 104: Receive garments from consumer. Customers may employ several methods to deposit garments for cleaning, pressing, tailoring and/or repair. The simplest method entails depositing a collection of garments with or without an entry slip, in which case the LASRS provides access to an open tote into which the consumer places the garments. This approach does not allow the LASRS to log and track each garment and, thus, requires the consumer to trust the LSP that handles the garments. To provide more traceability, consumers may also employ an article-by-article entry approach. This approach requires the user to either scan a barcode on each article, use the LASRS camera if one is available to capture an image of the article, write a description of the article (even if it simply describes the type of garment), or simply increase the tally of articles corresponding to a garment type.

Step 106: Prompt consumer for handling and/or delivery instructions. Consumers may desire specific handling beyond simple garment cleaning. For example, consumers may instruct the LSP to address stains, tears, loose stitching, and/or needed tailoring, and may also describe the types and levels of detergent, starch, etc., to be used in processing the clothing. To collect these special instructions, the LASRS enables the consumer to enter requests in written form, whether handwritten on the entry slip or typed on a keypad at the LASRS, or through video and/or audio recordings. Delivery preferences may also be entered by the consumer through a human-machine interface (HMI) provided at the LASRS, or through a customer profile accessible through the Internet, for example. Specifically, a consumer may desire to have the LSP deliver the completed garments to an address (provided that LSP offers such a service), or the consumer may wish to have the garments returned to a particular LASRS (even if it is different from the LASRS used to receive the garments from the consumer). Additionally, a consumer may have desired delivery dates.

Step 108: Prompt consumer to choose a particular LSP, if the LASRS is a broker-type LASRS. One advantage of the broker-type LASRS is that it can bring a broad spectrum of LSPs to the consumer, even if the LSP is geographically distant from the consumer. At multiple points in the in-processing of the consumer, the consumer may choose an LSP for handling the garments. If multiple LSPs are desired, the consumer may be required to divide his/her garments into different transactions and, thus, groups. When LSPs' rates are known, the LASRS HMI may indicate, e.g., in a table, one or more LSPs' estimated handling costs and delivery times corresponding to the number and types of garments entered.

Step 110: Securely store received garments. Once payment and/or identification information is validated and the consumer has entered handling, delivery and LSP instructions, one or more totes will be made available to receive and securely store the garments until they are picked up by a LSP agent. If one tote does not adequately hold all of the consumer's garments, more totes will be provided on an as-needed and as-available basis. Each tote used to store received garments is exclusively associated with the transaction for traceability, and so that LSP couriers will know the number of totes they must access to receive all garments. Before the transaction is complete, the consumer must acknowledge that each tote is filled and securely closed. Each tote is then automatically moved from the consumer access point to a storage position within the LASRS housing. Security measures for making the LASRS housing secure and tamper-resistant should be employed. It should be noted that the audio/video capture capabilities of the HMI may be employed to enhance the physical security of the stored garments, as well as the personal security of the consumers using the LASRS.

Step 112: Alert LSP that garments are waiting. After the transaction is complete, the chosen LSP is alerted that garments are waiting at the LASRS. This alert may be generated immediately after each transaction is complete, in some cases, while in other cases alerts may be generated periodically, such as once an hour, twice a day, or the like. Alerts may come in the form of emails, phone calls, text messages and/or any other available media. Contained within the alert may also be all associated handling and delivery preferences including access to the video, audio and/or text-based instructions. Also contained within the alert may be access to billing information.

Step 114: Release dirty garments to qualified LSP courier. A courier dispatched by one or more LSPs accesses the LASRS to receive the garments. Once his/her credentials are verified, all totes containing garments associated with the chosen LSP represented by the courier are sequentially presented for the courier to access. For each tote accessed, the courier must acknowledge that it is empty and, if necessary, note any problems, concerns or observations. The courier is encouraged to check the quantity and type of garments contained in each tote with respect to the consumer's entries; if there is a discrepancy, it is to be noted with the LASRS and LSP so that it can be reconciled with the consumer. The courier is also encouraged to disinfect the tote to protect garments that may subsequently reside in it, and/or to use a desiccant to ensure dryness.

Step 116: Alert consumer that garments have been picked up for processing. When the service is available and desired by the consumer, either the LASRS or LSP, or both, may notify the consumer at each step of handling including, but not limited to, receipt of garments, handling of garments, acknowledgements of handling/delivery requests, etc. This is often referred to as "workflow", and such alerts may be sent automatically or they may be in response to a query by the consumer through internet, text and/or IVR applications.

Step 118: Update transaction information—Prompt consumer for any handling and delivery changes. When the service is available and desired by the consumer, the LASRS or LSP may notify the consumer of any unique observations including, but not limited to, needs for service changes, discrepancies, delivery constraints, unnoticed stains, insufficient handling information, delivery options, billing changes, etc. These observations may be sent automatically or they may be in response to a query by the consumer through internet, text and/or IVR applications. Additionally, optional channels through which the consumer may respond are contained in such messages.

Step 120: LSP courier deposits cleaned garments. LSP couriers deposit garments into the LASRS after they have been handled by the LSP. A courier dispatched by one or more LSPs accesses the LASRS to deposit the garments. Once his/her credentials are verified, unoccupied totes available to support deposited garments will be sequentially presented for the courier to access and populated with garments associated with a particular transaction. For each tote accessed and populated, the courier must acknowledge that it is populated and, if necessary, note the specific garments inserted (typically through LSP barcodes), any problems, concerns or observations. The courier is encouraged to check the quantity and type of garments deposited in each tote with respect to the consumer's entries and LSP's records; if there is a discrepancy, it is to be noted with the LASRS and LSP so that it can be reconciled. The courier is also encouraged to ensure that the tote is disinfected before garments are inserted.

Step 122: Receive billing details from LSP. Depending on the LASRS revenue model, it is anticipated that LSPs will prefer to directly handle all billing associated with the garments they handle. It is also possible that the LSP may require the LASRS to broker transactions with the consumer. Under either circumstance, the LASRS is provided with a record of the transaction details so that they may be included on any receipt provided as a paper record to the consumer.

Step 124: Securely store processed garments. After the LSP courier has deposited garments into a tote and has ensured that the tote is securely closed, the tote is then automatically moved from the consumer access point to a storage position within the LASRS housing until the consumer returns to the LASRS to retrieve the garments.

Step 126: Alert consumer that processed garments have been received and are waiting. When the service is available and desired by the consumer, the LASRS or LSP may notify the consumer that his/her garments are waiting at the LASRS. These notifications may be sent automatically or they may be in response to a query by the consumer through internet, text and/or IVR applications. Additionally, optional channels through which the consumer may respond (e.g., billing, alternative person for pickup, etc.) are contained in such messages.

Step 128: When the consumer (or his or her designee) returns, verify identification, return garments, and provide payment information. This may include the collection of the payment, in some cases. A consumer or designee will access the LASRS to receive the garments. Before any garments are released, identification will need to be verified. Typically, and depending on the services available and preferences by the LSP and/or LASRS, identification may be obtained by credit card, biometrics, video conference, pass codes, etc. If the LASRS is required and able to collect payment, credit, debit and/or cash payments will be received and verified.

Step 130: Allow retrieval of garments. A consumer or designee will access the LASRS to receive the garments. Once his/her credentials are verified and payment is received, all totes containing garments associated with the transaction will be sequentially presented for the consumer to access. For each tote accessed, the consumer must acknowledge that it is empty and, if necessary, note any problems, concerns or observations. The consumer is encouraged to check the quantity and type of garments placed in each tote with respect to the consumer's original entries; if there is a discrepancy, it is to be noted with the LASRS and LSP so that it can be reconciled.

As can be seen in FIG. 1, steps 102 to 108 and 128 to 130 involve interaction with the consumer. Accordingly, an appropriate consumer-oriented human-interface system is required, as well as a mechanism to allow the consumer to deposit garments for servicing and to retrieve cleaned garments. Steps 114 and 120 involve interaction with a LSP employee, such as a courier, and require a mechanism to allow retrieval of deposited garments and deposit of cleaned garments. If the LASRS provides pick-up and drop-off services for multiple LSPs, the LASRS may also be equipped with security mechanisms to ensure that garments designated for a particular LSP are released only to employees of that service provider.

Many or all of the operational features illustrated in FIG. 1 can be provided by a small-footprint, environmentally sensitive, LASRS. To meet various consumer and retail demands for convenience and cost-effectiveness, several embodiments of the LASRS include all or several of the following features.

Interior or Exterior Placement:

The LASRS may be placed indoors or outdoors to maximize convenience for consumers and businesses. Installation of LASRS inside buildings may serve consumers in grocery stores, drug stores, department stores, and in the workplace. A LASRS may also be deployed outside of buildings to serve consumers within shopping centers and directly outside retail stores or workplaces. An outdoor deployment of the LASRS can offer the additional conveniences of drive-up service and any-hour operations.

Small Footprint:

Indoor retail floor space is expensive, in various areas costing from $10 to $30 per square foot on an annual basis. Outdoor sidewalk space is often narrow, and parking lot space is often limited. Several embodiments of the LASRS described herein have a very small horizontal footprint facilitated by the use of a novel tote-based vertical conveyor and storage technique.

Storage Tote:

At the heart of several embodiments of the LASRS is a container that communicates with the LASRS's control and conveyor systems and rides along a track from any of several storage positions to and from one or several access points, which allow consumers or service personnel to access the container's contents. The container, called a "tote" or "apparel tote" herein, is a storage module into which users place garments and/or from which users receive their garments. A LASRS unit will generally contain several apparel totes, each sized to enclose a plurality of apparel items on hangers and each having a latching access panel to allow deposit and retrieval of clothing items by the consumer and by LSP personnel.

Multi-Layer Conveyor System:

A unique multi-layer conveyor system is configured within the LASRS housing to selectively move apparel totes to and from a customer access position, from where the consumer can deposit and retrieve clothing into an assigned tote, and to and from several storage positions. These storage positions can be distributed on several layers stacked above one another, thus reducing the horizontal footprint of the system.

Human-Interface System:

The human-interface system is used by LSP personnel and/or the consumer to deposit and retrieve articles from the LASRS. In the case of the consumer, the human-interface system is configured to receive consumer input, such as payment information and handling/servicing instructions and to provide transaction feedback, such as confirmation information, receipts, and the like. A range of human-interface devices may be used, including video screens, touch screens, keypads, audio input and output devices, card readers, and printers. In some cases, the human-interface system may include two-way audio and/or video conferencing capability to allow the consumer (or service personnel) to communicate directly, in real time, with remotely located LSP personnel.

Sensor Device:

In some systems, each tote is equipped with a machine-readable medium carrying a tote identifier code; bar codes or radio-frequency identification (RFID) chips may be used for this purpose, for example. In these systems, the LASRS further includes a sensor device, i.e. a "reader," that can read the tote identifier code from a tote. Examples of sensor devices include a bar-code reader, an RFID interrogator/reader, a camera or other imaging device coupled to a pattern-matching computer processor or to a text-to-speech processor. This sensor device is coupled to the control system, enabling the control system to dynamically track the locations of the totes within the LASRS. Other information, such as information identifying the contents of the tote or a corresponding customer, may also be stored in or on the machine-readable medium in some systems.

Control System:

The control system includes one or several control processors (e.g., microprocessors, microcontrollers, or the like) disposed within the LASRS. This control system is connected to the human-interface system to collect customer input, produce transaction feedback, etc. The control system also manages the motion of actuators and monitors any sensors, as well as interfacing with any external control devices or systems.

Scalability:

The LASRS is based on a modular design that allows owners to expand or reduce capacity by inserting or removing lateral and/or vertical conveyor segments and tracks. If expanding vertically, the business owner will likely not face additional space rental costs, which are usually based on floor area (not vertical height).

Portability:

The LASRS' design allows an owner to strategically locate LASRS units in response to actual sales performance, relocating or upgrading each unit as needed to respond to changes in sales or other factors. Combined with low installation and operational costs, the LASRS' portability can help business owners mitigate risk in an unprecedented way.

User-Friendliness:

Users of the LASRS can generally be defined as consumers, couriers and technicians. For all user types, the primary interface is the human-interface system. Consumers employ the LASRS to deposit garments and associated handling requests, receive garments, make payment and submit feedback to LSPs. Couriers remove deposited garments from the LASRS, transport them to the LSP plant, gather handled garments from the LSP plant, transport them back to the LASRS, and place the handled garments in the LASRS. Technicians maintain and, if necessary, repair the LASRS on-site or remotely. The human-interface system should be designed to facilitate all of these activities in a user-friendly, intuitive manner.

Interoperability:

The LASRS must interface to other systems that enable business operations, technical support and communication with clients. These systems may include point-of-sale (POS) systems, which can automatically process payments, deposits and refunds, and/or workflow systems, which may include operation management software systems that track and allocate inventory, parcels, couriers, laborers, technicians, etc. Other systems with which the LASRS might interface include client services software to enable communication with customers. Examples of the communication types that may be used include automated text messages, emails, interactive voice response (IVR), recorded messages, phone calls, and web-based tools. To achieve this interoperability, various embodiments of the LASRS will utilize one or more communication systems, including, but not limited to high- and low-bandwidth systems, whether based on wired, fiber-optic, and/or wireless technologies.

Cleanliness:

The LSARS must keep garments isolated from the soil and scents that may exist on other garments and outside the LASRS. This may require the use of physical barriers, seals, pressurization and filtered ventilation.

Climate-Control:

Some LASRS units employ an HVAC system that maintains the temperature and humidity at levels that protect garments. Climate-control requirements will vary depending upon geographic location and placement of the units. For instance, indoor units may need no climate-control system at all.

Environmentally-Friendly:

The LASRS will provide significant environmental advantages over LSP drop-off stores and courier options. As shown in more detail below, widespread deployment of LARSR units in the United States could reduce the national annual carbon footprint of LSPs by 47,000 metric tons.

Figure 2:
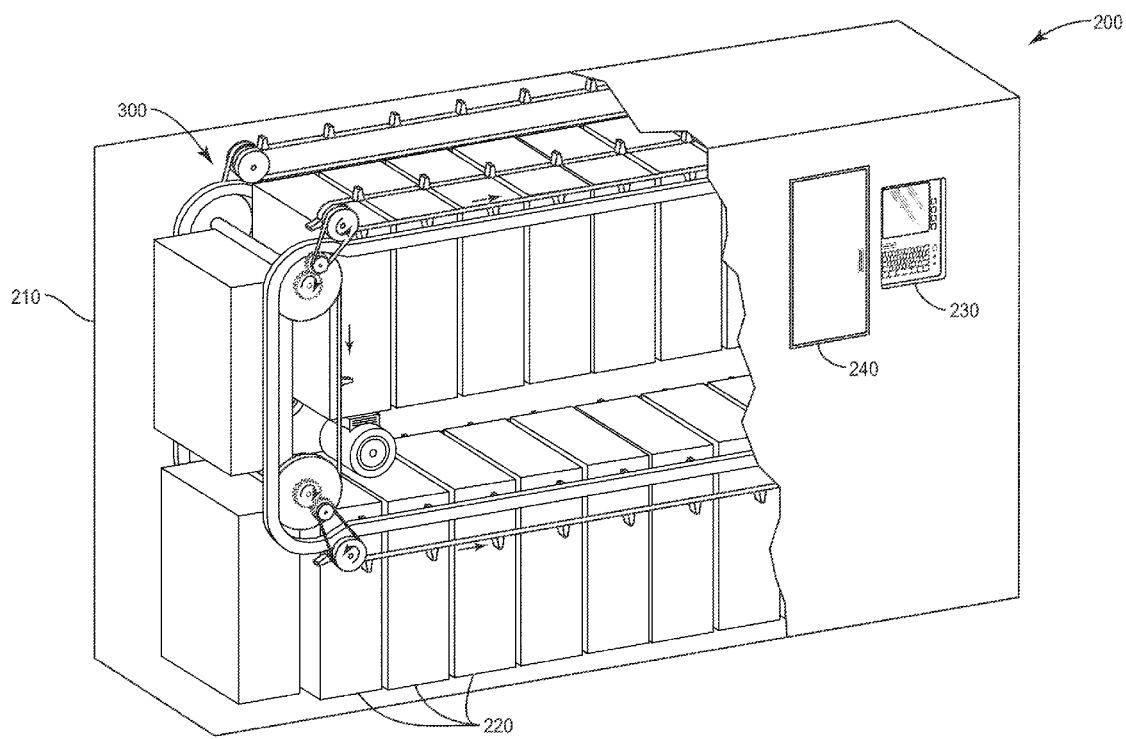
FIG. 2 is a perspective view of an example LASRS.

As noted above, the "apparel tote" is central to many embodiments of the LASRS. The LASRS will generally include several apparel totes, with the exact number depending upon the overall size of the unit and/or the anticipated demand for the LASRS's services. An illustration of an example LASRS is shown in FIG. 2, where LASRS 200 includes a housing 210, which contains several apparel totes 220 on each of two layers of an example storage/conveyor system 300, the details of which are discussed below. Housing 210 also includes a human-interface system 230, which allows consumers and service personnel to interact with LASRS 200 for dropping off clothing, retrieving processed clothing, servicing the system, and so on.

LASRS 200 also includes an exterior door 240, which protects the LASRS interior from exterior elements, is sized to limit access to only the tote's interior, comprises security mechanisms that are controlled and/or monitored by the LASRS, and may be automatically or manually opened or closed in various implementations. In the example embodiment pictured in FIG. 2, the exterior door 240 is situated on the broad side of the LASRS 200. In other embodiments, the exterior door may be instead situated on one of the narrower ends of the LASRS 200.

FIGS. 6A and 6B illustrate an example apparel tote 220. Although the details of the apparel tote may vary from one LASRS to another (and even from one apparel tote to another within the same LASRS, in some cases), the following features are typical for many.

Transaction-Dedication:

Generally speaking, a tote will store articles from one, and only one, user transaction. A tote with articles corresponding to a given user transaction cannot be accessed by any other user.

Internal Configurability:

The totes in some systems can be configured to accommodate different storage modalities. For example, fold-down shelves 222, examples of which are illustrated in FIG. 6A, enable the placement of loose or folded garments. Fold-down shelves may be maintained in an out-of-the way configuration using a suitable latch, such as the magnetic latches 223 shown in FIG. 6A. Rods 224 enable the placement of garments on hangers 226.

Bulkheads:

Tote walls 228 are formed by substantially rigid surfaces that contain customer garments and protect them from mechanisms within the LASRS. The tote walls also serve to isolate a tote's contents from other garments inside the LASRS.

Door:

Consumers access a tote 220 when the LASRS brings it to the user access position. Typically, the LASRS will have one or more exterior door(s) located near the HMI, such as exterior door 240 in FIG. 2. When the tote arrives, it is aligned with the exterior door and positioned before the door is opened. The tote 220 has a latching access panel as well, which is illustrated as door 229 in FIG. 6A. The exterior door on the LASRS may engage the tote door 229 to open or close it as it opens or closes, in some embodiments. Alternatively, the exterior door may merely give the consumer, courier or technician access to the tote door 229. In this case, the LASRS may be configured to monitor and/or control a latch that ensures the tote 220 is closed before it moves into the interior of the LASRS, as it is essential that the door 229 be closed properly and that no garments can protrude through the door-tote interface. Sensors may be used to check for this, in some embodiments. In the embodiment pictured in FIGS. 6A and 6B, the tote door 229 is located on a narrow vertical face of the tote 220, so that it is opened along the arm of a garment. However, it is possible that the tote in some systems could have a tote door on a wide vertical face of the tote 220, if the exterior door for the LASRS is located at the end of the LASRS. Other configurations are possible, of course.

Tote Aspect Ratio:

In general, totes have a box-like shape, with overall height, width and depth dimensions. The height, H, represents the vertical dimension. The height H may be about 36 inches, in some systems, but may vary substantially from this height. The width, W, represents the horizontal left-right dimension, and can be correlated to the axis of the conveyor system's travel, as well as the front-back direction that hanging garments face. An example width is from 8 to 10 inches, for some systems. The depth, D, represents the shoulder-to-shoulder or cuff-to-cuff dimension for hanging garments. A typical depth might be 24 to 30 inches. The tote's aspect ratio is defined here as its height-to-width ratio. This aspect ratio is important for at least two reasons. First, it must be selected to accommodate the vast majority of hanging garments. Second, this aspect ratio dictates the minimum vertical-to-horizontal speed ratio for the multi-layer conveyor system used in some LASRS.

Track Interface:

Each tote has a plurality of passive mechanisms that fit into or onto a track, which contains and guides the tote along an arbitrary path defined by the conveyor system. Passive mechanisms may include, but are not limited to, casters, rods, slides, roller bearings, and linear bearings. In FIGS. 6A and 6B, tote 220 includes on each side a rounded wheel 610 that can ride within a curved track 650, like those commonly used for garage door systems. Other systems might utilize a "V"-shaped or "W"-shaped wheel, suitable for riding along a rail, on one or both sides of the tote. In the embodiment pictured in FIGS. 6A and 6B, wheels 610 are mounted on a rod, which may be surrounded by a sleeve 640. The sleeve 640, which is free to rotate independently of the interior shaft, provides a drag point for a conveyor system. Note that the tote 220 may be designed to accommodate a drag point on either or both sides, in various systems.

Conveyor Interface:

Each tote may include a rigid and/or compliant component that engages the conveyor along multiple surfaces, and at multiple angles. Rigid components may include, but are not limited to, static sprockets, catch points. Compliant components may include, but are not limited to, high-friction surfaces, such as for engaging a conveyor belt, clutch-enabled sprockets for engaging a chain-drive, and rolling rods. The tote illustrated in FIGS. 6A and 6B, for example, is conveyed using the rolling rod approach. The conveyor system detailed in FIG. 5, which will be described in more detail below, uses a tote 520 that includes clutch-enabled sprockets 525, which can engage a chain 580. Like the tote 200 illustrated in FIG. 2, tote 520 is supported by wheels 610, which ride in tracks 650. Notice that, as an example, a clutch-enabled or rigid sprocket can engage a chain-like conveyor at any angle. So, too, can a rod, such as the rod/sleeve 640 illustrated in FIGS. 6A and 6B, engage a conveyor with spars at any angle.

Compliance:

If a tote must move at a speed different from the conveyor, it must have compliance to prevent damage to itself, the conveyor of the system in general. Compliance is a safety feature potentially necessitated by several situations. One such situation is congestion: where totes ride in single-file on a multi-direction and multi-speed conveyor, it is possible that there will be zones affected by congestion where totes may be stopped even if the conveyor continues to move. Congestion zones may also include areas on the conveyor where there is a change in tote speed or direction. If the tote must move slower than the conveyor, a clutch or other slip-based mechanism on the tote itself may provide the necessary compliance. In some systems the compliance may be provided by the conveyor system rather than the tote.

Another situation that may require compliance of the tote is if the track becomes obstructed due to damage. In this situation, it is important that there is no collateral damage caused by the conveyor as it continues to attempt to move the totes. A clutch-based engagement mechanism may provide the necessary compliance. Repair and maintenance scenarios may also necessitate system compliance. If a service technician is performing maintenance and/or repairing the LASRS, compliance is important to protect him/her from harm otherwise caused by the moving conveyor components. Still other scenarios include situations caused by user error or misbehavior: if a consumer overloads or vandalizes totes, it is possible to adversely affect the LASRS conveyor. Building compliance into the system allows other totes to move at a speed set by the lame tote. Finally, compliance may be necessary to accommodate counter-torque: because totes may have an infinite number of load weight distributions, it is possible that the torque induced by the conveyor may counter-rotate the tote. While this can be easily constrained in vertical directions, it may cause a shingle-effect from totes moving in horizontal directions where there are physical gaps between sequential totes. Compliance allows totes to maintain a preferred orientation to protect its contents, as well as to minimize interference with other totes.

Unique Identification:

In some LASRS, each tote has a unique identification that allows the LASRS to automatically determine the location and, possibly, the health of individual totes. Tote identification also enables the LASRS to associate articles with a specific user-transaction. Mechanisms that convey the tote's identification may include bar codes, switch-codes, and radio-frequency identification (RFID) devices.

Power & Communications Interfaces:

In many systems, totes are passive, lockable compartments that do not require power or communication interfaces. However, in some systems it may be desired that totes have individual climate controls, actuators, sensors, content monitoring, health monitoring, or workflow traceability. In these systems, power and/or communication capabilities may be provided through rails and/or power storage devices. For instance, rails allow totes to physically contact conductive surfaces so as to receive power. Data may also be communicated through a conductive rail in some systems, while short-range wireless communications may be used in others.

Figure 3:
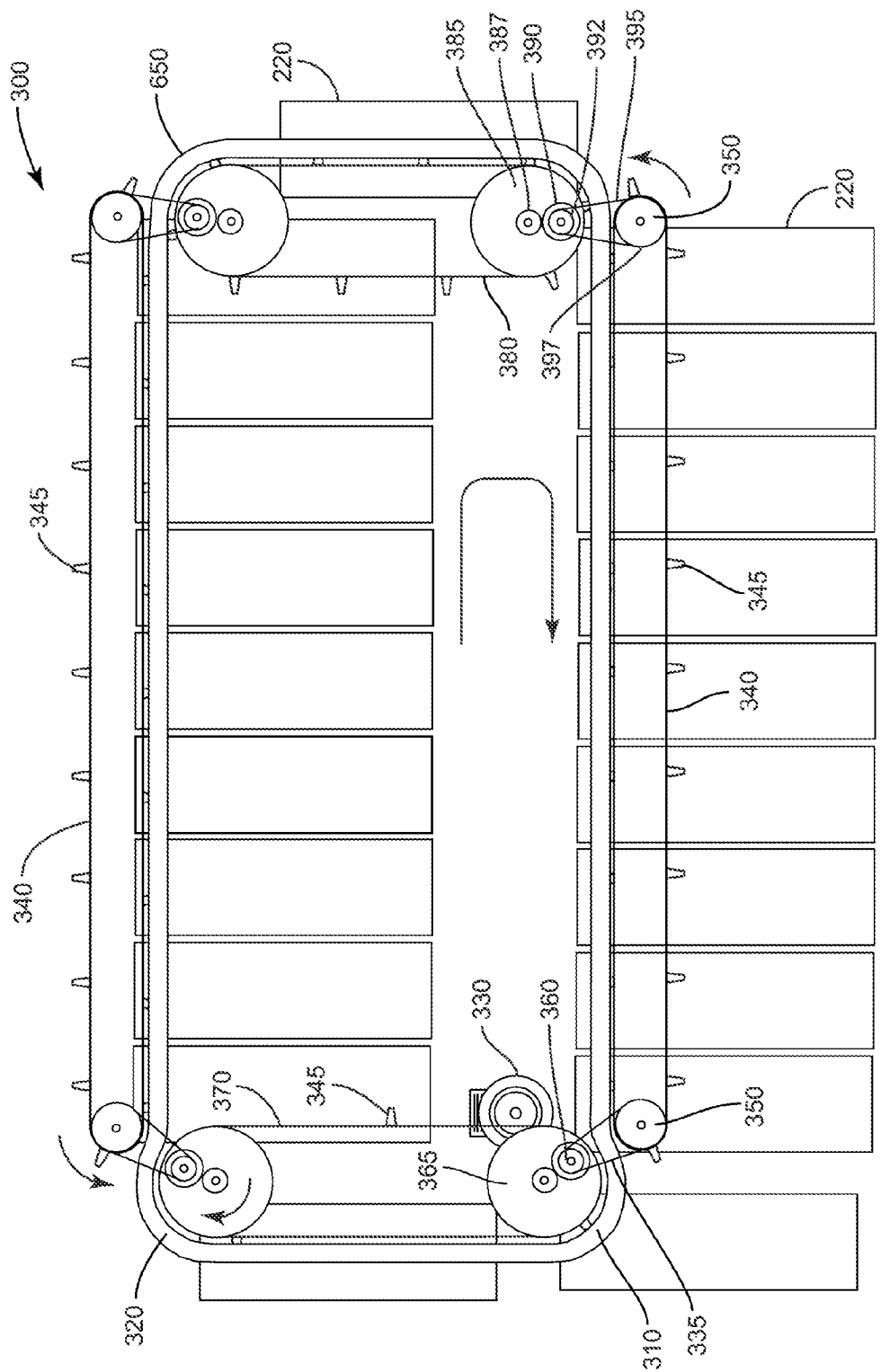
FIG. 3 is a schematic illustration of an example two-level conveyor system.

Another central component of many embodiments of the LASRS is a multi-layer conveyor system, which can selectively move apparel totes to and from a pre-defined customer access position, where a consumer can access the tote to drop off or retrieve clothing, and to and from a number of storage positions on each layer of the system. The multi-layer feature of the system, in which two or more generally horizontal layers are "stacked" on one another, allows for an efficient use of available volume, providing a small footprint for the LASRS unit. One example of a two-layer conveyor system 300 is illustrated in FIG. 3. While the details of the conveyor system may vary from one LASRS to another, the following features are typical for many.

Segments:

A conveyor may have multiple segments, which are defined by speed and direction. A two-layer LASRS generally has at least four segments. First, a bottom-lateral segment runs primarily parallel to the ground, left-to-right or right-to-left, and is closest in proximity to the ground. A vertical-up segment of the conveyor lifts the tote vertically upward, away from the bottom-horizontal segment. A top-lateral segment is where the conveyor again moves totes in a primarily horizontal direction (in a two-layer system, in a direction opposite the bottom-lateral segment). The top-lateral segment is also the highest rung in the LASRS. Finally, a vertical-down segment of the conveyor controllably lowers the tote vertically downward, away from a higher horizontal segment to a lower one. It should be noted that LASRS conveyor systems may include more than two layers, in which case the conveyor will also include one or several intermediate-lateral segments that convey totes in a substantially horizontal direction.

Transition Zones:

When totes must transition from primarily horizontal to primarily vertical motion, they enter a zone that allows them to change direction and/or speed free from conflict between the two adjacent segment drives, and still ensure that it will engage the vertical conveyor segment. These zones include a lateral-to-up zone where a tote reaches the end of a lateral segment and must be transferred to a vertical-up segment. In the conveyor system 300 of FIG. 3, the lateral-to-up zone is shown at 310. When a tote has been lifted high enough to clear the lateral segment beneath it, it transitions from a vertical direction to a lateral direction in an up-to-lateral zone. (See zone 320 in FIG. 3.) This zone allows the tote to change direction and/or speed free from conflict between the two adjacent drives, while still ensuring that it will engage the lateral conveyor segment. When totes must transition from primarily horizontal to primarily vertical motion, they enter a lateral-to-down zone that again allows them to change direction and/or speed free from conflict between the two adjacent segment drives, while still ensuring that it will engage the vertical conveyor segment. Finally, when a downward-moving tote has been lowered enough to clear the lateral segment above it, it transitions from a vertical down direction to a lateral direction in a down-to-lateral zone. This zone allows the tote to change direction and/or speed free from conflict between the two adjacent drives, once again ensuring that it will engage the lateral conveyor segment.

Track:

Like guardrails, a track constrains and guides the motion of an object on a conveyor. The LASRS' track is comprised of contoured channels or rails that support, guide, and limit the tote's motion along its conveyor. The track also forces the tote to maintain contact and alignment with the conveyor to ensure deliberate transport. Various configurations of the track are possible, including "C"-shaped tracks like those commonly found in garage door systems. The example system 300 shown in FIG. 3 includes a C-shaped track 650.

Single-Drive Mechanism:

Unlike many conveyors that transport objects in multiple directions and at multiple speeds, the LASRS conveyor is preferably driven by a single torque source, illustrated as motor 330 in FIG. 3. A single-drive system reduces the number of failure points and thus improves the mean-time-between-failures (MTBF). A single-drive system also facilitates the use of redundant drive sources, which can improve system reliability even further. Primarily-vertical and primarily-horizontal conveyor paths are coupled through mechanical transmissions (e.g., gear ratios) that convert speed and torque. Totes conveyed in a primarily-horizontal direction move at a speed slower than the primarily-vertical direction. Conversely, totes conveyed in a primarily-vertical direction move at a speed faster than the primarily-horizontal direction. The vertical-to-horizontal speed ratio is greater than or equal to the tote aspect ratio. Vertical speed may be limited by tolerable acceleration profiles for the tote's contents and/or the maximum torque limits on the conveyor system.

Transition Zones:

The LASRS' conveyor moves totes in multiple directions and speeds. Consequently, there are speed- and direction-transition zones along the conveyor's path. At these transition zones, it is important that totes experience compliance to ensure they do not jam or otherwise interfere with each other, and still maintain motion to engage conveyor segments. As an example, if a tote is transitioning from a conveyor segment at one velocity-and-torque level to another conveyor segment at a different velocity-and-torque level, the tote cannot simultaneously be engaged by both segments or there will be a mechanical conflict. That is, one segment would try to move the tote at one speed as the other segment tries to move the tote a different speed. Typically, mechanical conflicts like this result in damaged mechanisms like sheared gear teeth, torn belts, or broken chain links. To prevent mechanical conflicts, a tote must enter a zone where it is temporarily free, i.e., disengaged, from drive mechanisms in both segments, but still moving in a direction that will cause it to engage with the next conveyor. Ramps, rollers and slides are usually the preferred form of compliance in transitions zones. Several embodiments of the LASRS employ arcing slides (as shown at zones 310 and 320 in FIG. 3, which exploit gravity and minimal friction to ensure successful transition between conveyor segments.

The conveyor system 300 in FIG. 3 is but one example of a full mechanically-coupled conveyor drive, which in this case is powered by a single torque source 330. Lower horizontal belt 340 is rotated in a counter-clockwise fashion by pulleys 350. Attached to the conveyor drive are outwardly oriented protrusions or raised links 345 to engage the tote 220 at a catch point and move it along a horizontal path from right to left. The protrusions or raised links 345 may be compliant. The tote's wheels ride in or on the track 650. The leftmost pulley 350 is rigidly coupled to another pulley of similar size that drives a belt 335 in a counter-clockwise pattern to drive a smaller pulley 360. The smaller pulley 360, which moves at a faster speed and lower torque than pulley 350, is rigidly coupled to a gear that engages another gear, which is rigidly coupled to the vertical conveyor drive pulley 365. Due to the combination of gear-and-pulley transmission, the vertical conveyor drive pulley 365 is forced to rotate in the clockwise direction, at a faster speed and lower torque than the horizontal conveyor drive pulley 350. The vertical conveyor drive pulley 365 moves the vertical drive belt or chain 370 in the clockwise direction. Attached to the vertical conveyor drive 370 are outwardly oriented protrusions or raised links 345 to engage the tote at a catch point and move it along a vertical path from bottom to top. The protrusions or raised links 345 may be compliant. The protrusions of adjacent belts are spaced to prevent collisions as totes transition from one direction of travel to another. Ramps are also used to facilitate the transition from one drive belt to another. For example, at the left most end of the bottom drive belt is a slight ramp, in zone 310, which leads totes away from the end of the horizontal drive belt. The valley after (i.e., to the left of) the ramp captures and holds the tote until a protrusion on the vertical lift belt can convey it vertically upward. At the top of the vertical lift belt is an apex with another ramp, at zone 320. This ramp enables the tote to slide away from the vertical lift belt 370 after the apex, and before the vertical lift belt 370 can try to pull the tote downward with its return path. After the tote has moved away from the vertical lift belt 370, it may loiter at the end of the ramp until protrusions 345 from the top conveyor drive belt 340 can engage it, or it may be engaged simultaneously as it is descending down the ramp. The top conveyor drive belt 340 rotates in the counter-clockwise direction and uses the protrusions on the lower segment of belt 340 to push the tote from left to right. Once the tote has reached the right-most end of the top horizontal conveyor drive belt, it descends down an arcing ramp to transition to the vertical down conveyor drive belt 380. Unlike the previous three segments, the vertical down drive belt 380 actually resists the tote's natural inclination to fall, providing instead a controlled descent at a rate that prevents damage and facilitates engagement with the lower horizontal segment. Note that in the pictured system, belt 380 has more closely-spaced protrusions than are found on belt 370. The spacing should be selected to properly space the totes from one another as they are moved through the system.

Once a tote 220 has reached the lower end of the downward-going segment at the right-hand side of the conveyor system 300, it transitions onto the lower horizontal belt 340, to be pulled towards the left side once more. Detailed components involved in this transition include, in addition to belts 340 and 380, pulleys 385, 392, and 350, as well as gears 387, and 390. A side view of this transition region is illustrated in FIG. 4, which is described in detail below.

Figure 7:
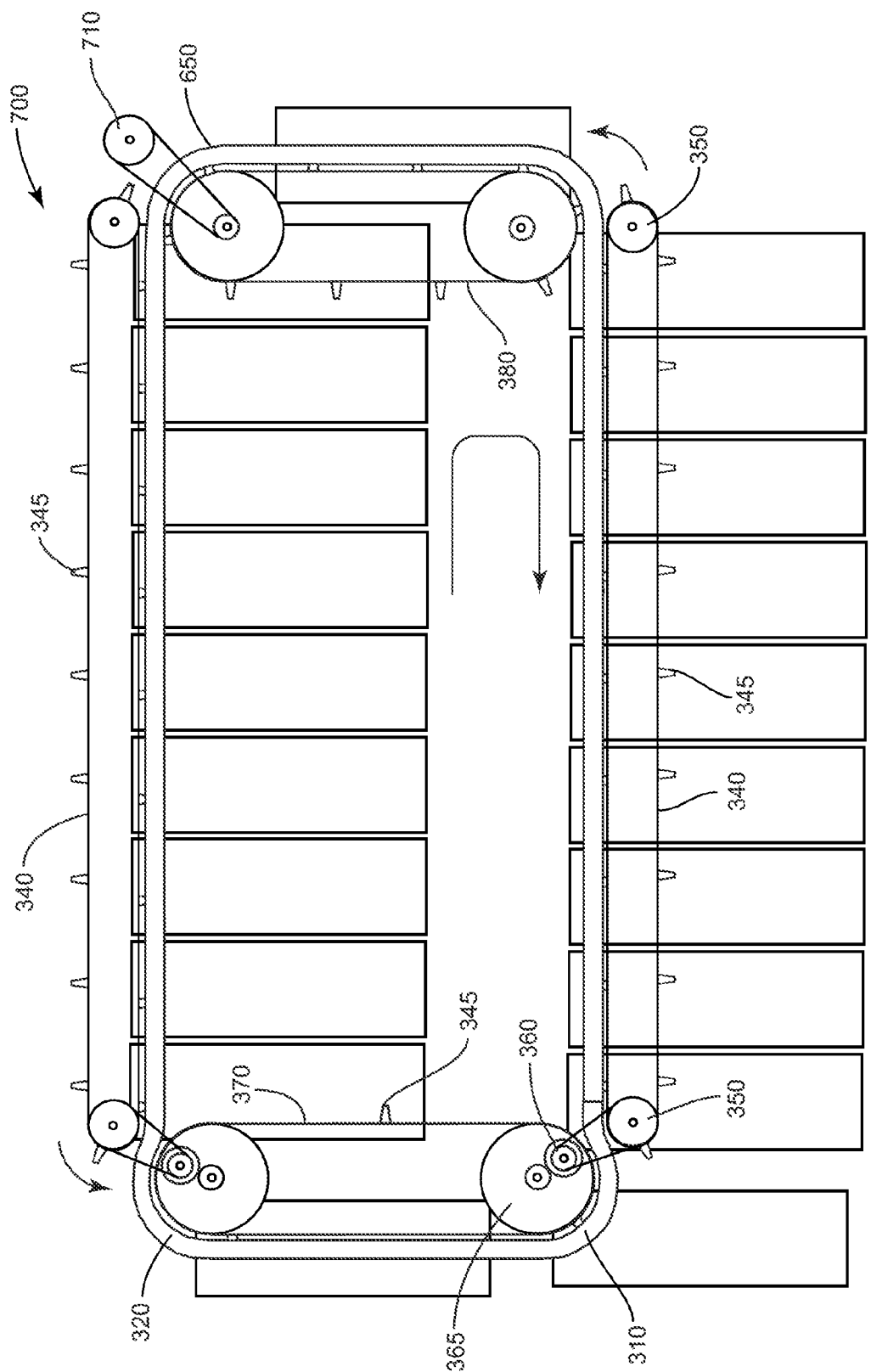
FIG. 7 is a schematic illustration of another example two-layer conveyor system.

In the example system illustrated in FIG. 3, all four of the segments are coupled together, so that a single mechanical torque source 330 can power the system. The conveyor system 700 in FIG. 7, on the other hand, is an example of how one or more segments can be mechanically decoupled. In this system, the rightmost vertical drive segment is not coupled to the others, and is instead powered separately through pulley 710.

Each segment or mechanically-coupled combination of segments requires its own torque or counter-torque source. Thus, for example, the system illustrated in FIG. 7 needs two torque or counter-torque sources (not shown). The decision to decouple conveyor belt drives is based in part on the need or lack thereof for the segments to be mechanically coupled and, hence, synchronized, or the need or lack thereof to minimize the number of torque sources to, among multiple reasons, reduce costs, minimize space consumption, minimize power requirements, minimize design complexity, minimize control complexity, maximize compliance, etc.

Figure 4:
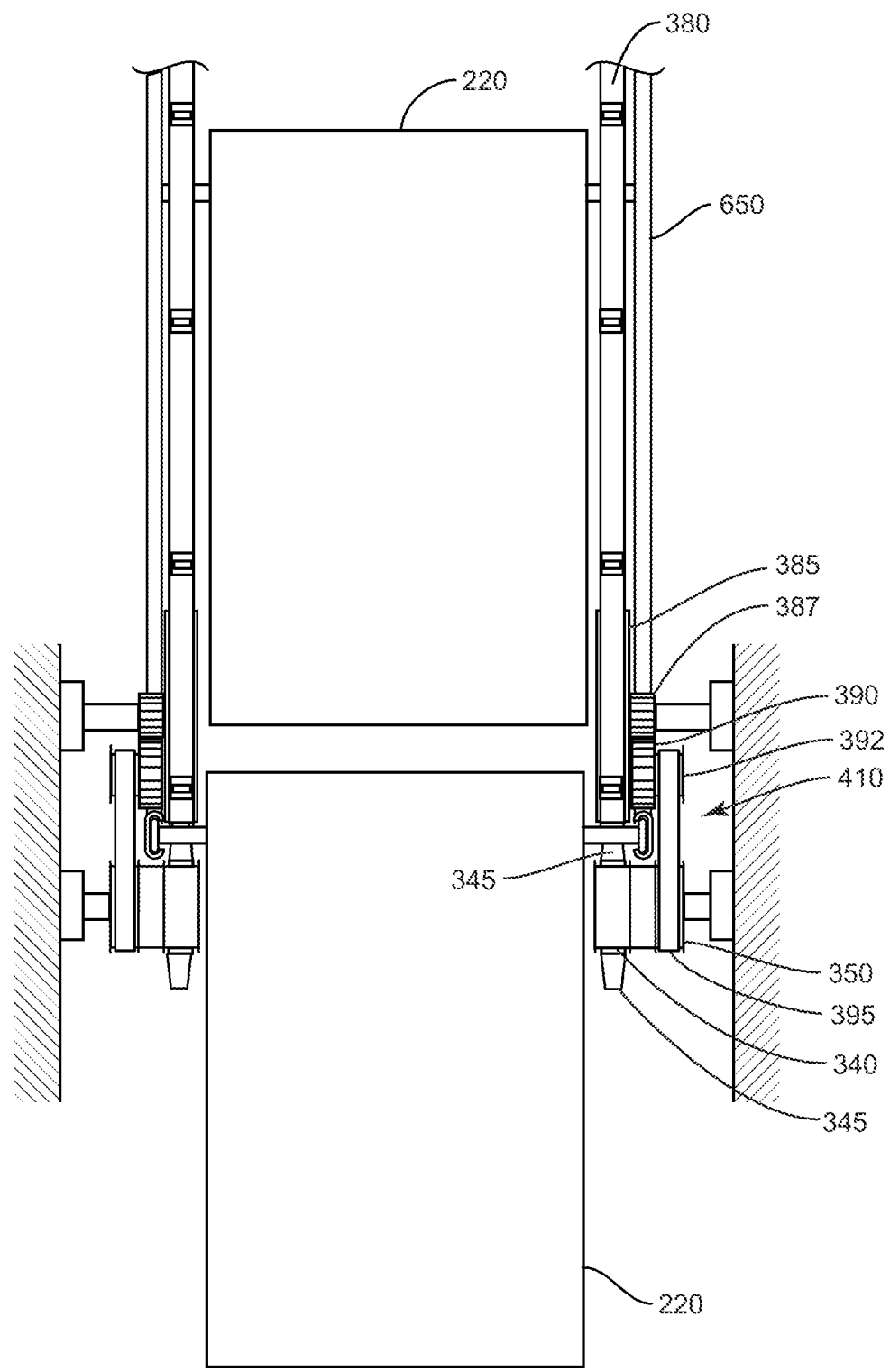
FIG. 4 illustrates details of a conveyor system, according to some embodiments of the invention.

FIG. 4 is view of a portion of the conveyor system 300, detailing a few of the drive mechanisms that may be used in some embodiments of a LASRS. This view may be best understood as a view from inside the LASRS 200 of FIG. 2 and the conveyor system 300 of FIG. 3, looking toward a "hand-off" region or "transition" region 410 at the lower right-hand side of conveyor system 300.

An upper tote 220, riding in track 650, is being lowered towards the hand-off region 410 by protrusions 345 on belt 380. The protrusions engaging the tote 220 are on the far side of belt 380, and are thus not visible in FIG. 4. A second tote 220 is actually in the hand-off region 410, having just been lowered by belt 380 into a region where a protrusion 345 on belt 340 engages the drag point on the rod extending through the tote 220.

Figure 5:
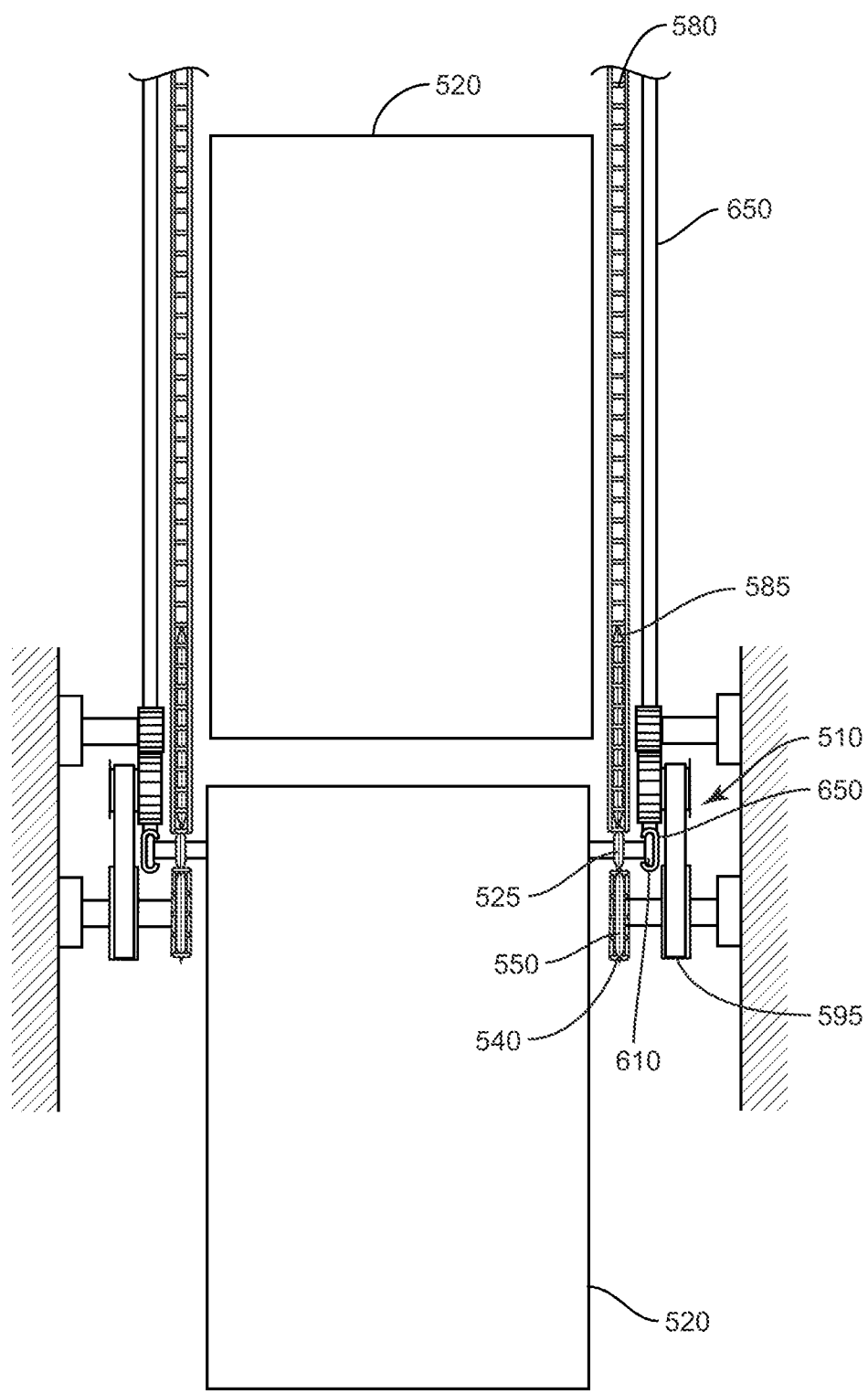
FIG. 5 illustrates details of another conveyor system, according to other embodiments of the invention.

FIG. 5 is an end-view of a portion of another conveyor system, this one using a chain drive system. This view is from a comparable position within a LASRS, and thus illustrates a hand-off region 510 in a chain-driven conveyor system. In this system, belts 340 and 380 are replaced by corresponding chains 540 and 580, which ride on sprockets 550 and 585, respectively. In the system pictured in FIG. 5, sprockets 550 and 585 are coupled together by a belt 595 and pulleys; a chain and sprockets could be used instead. Note that in this system, the totes 520 include a sprocket 525 that is engaged by chains 540 and 580, successively, as the tote moves first laterally, then through the transition region 510, and then vertically. This sprocket 525 may be clutch-enabled, in some embodiments, to provide a degree of compliance and to avoid a binding of either chain as the tote moves through the transition. It should also be appreciated that two sprockets 525 may be used in some cases, on either or both sides of tote 520, with one sprocket 525 situated so as to engage the vertical chain 580, and the other situated so as to engage a laterally displaced horizontal chain 540.

Figure 8:
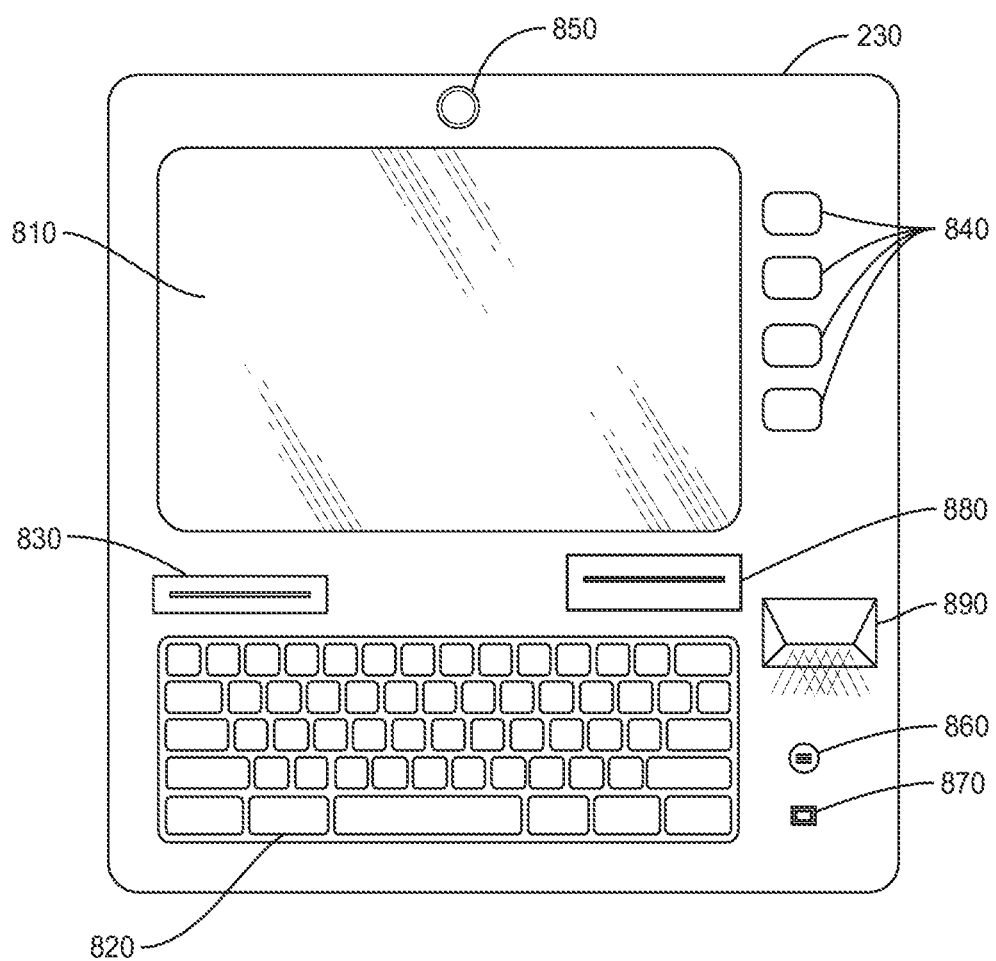
FIG. 8 is an illustration of an example human-interface system.

FIG. 8 illustrates several features of an example human-interface system 230. The human-interface system in an LASRS is generally used for consumer transactions, such as the consumer transactions outlined earlier in the discussion of FIG. 1, but may also be used for service personnel activities, including the drop-off and pick-up of laundry, servicing or testing of the unit, etc.

The illustrated human-interface system 230 includes a display screen 810, which may comprise touch-screen technology in some embodiments. Human-interface system 230 further includes a keypad 820—this may be unnecessary or redundant in systems using touch-screen technology for data input. A credit-card reader 830 is also included, as are a receipt printer 880 and several function keys 840, which may be dedicated to specific input functions, in some embodiments, or which may be "soft" keys that correspond to user selections that are presented on display screen 810, in others. A bar-code scanner 890 is also shown; bar-code scanner 890 may be used to scan courier identification badges, for example, and/or to scan labels on clothing, coupons, etc.

Human-interface system 230 also provides for real-time audio-video communications with LSP personnel or for the recording of audio and/or video messages/instructions for LSP personnel, or both. Accordingly, human-interface system 230 includes a camera 850, a speaker 860, and microphone 870. In addition to permitting real-time or recorded audio-video communications between consumers and LSP personnel, these features may also be used for security purposes, such as to detect vandals.

The LASRS unit's human-interface system and conveyor system are tied together by a control architecture, which may include elements in the LASRS as well as external elements. The control architecture also tracks consumer transactions and, in some embodiments, provides for real-time or recorded communications between consumers and LSPs.

Generally speaking, there are three major layers to the LASRS' electronic control architecture. First, a low-level layer, which may include a separate low-level control processor in some embodiments, manages the motion of actuators and the monitoring of sensors. The hardware component of the low-level controller is typically a multi-axis microprocessor-based system with data acquisition and, possibly, digital signal processing. Low-level control may be based on a centralized, distributed or hybrid configuration of modules. Second, a mid-level control layer, which again may include a separate mid-level control processor, resides on the LASRS and provides overall LASRS system management. The mid-level controller is often based on one or more central processing units (CPUs), and fuses low-level controllers with peripherals including barcode scanners, card readers, printers, video cameras, keypads, printers, etc. The mid-level controller contains software for the human-interface system, data-logging and on-site technical support. The mid-level controller also interfaces the LASRS to high-level control systems. Finally, high-level control systems comprise the myriad systems that coordinate business transactions, interpret the LASRS' performance, monitor tote occupancy/vacancy levels, socially coordinate with consumers, and provide remote access, upgrades and control.

Figure 9:
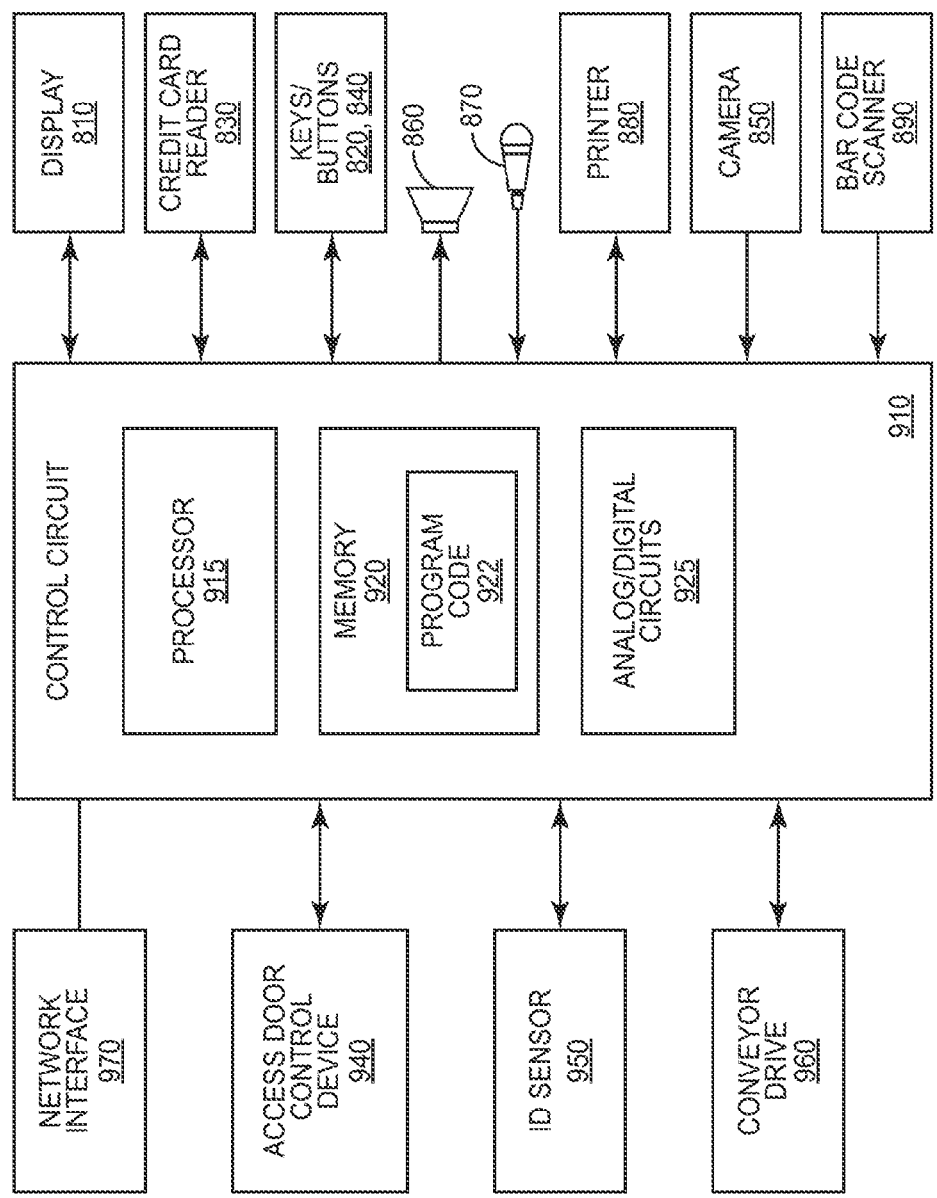
FIG. 9 is a block diagram illustrating functional elements of an LASRS control system.

FIG. 9 illustrates an example control system for an LASRS. A control processing circuit 910, which is included in the LASRS unit, comprises one or more processors 915, memory 920, and various analog and digital circuits 925 for interfacing the control processing circuit 910 to other circuits and systems in the LASRS. Memory 920, which may comprise one or several types of memory, such as RAM, ROM, Flash, etc., includes program code 922, which in turn comprises computer program instructions for carrying out control of the LASRS unit, interfacing with external systems, controlling the human-interface system, and so on.

Control circuit 910 interfaces to the various components of the human-interface system, such as the display 810 (which may comprise touch-screen technology for collecting user input), credit card reader 830, printer 880, bar-code scanner 890, keys/buttons 820 and 840, speaker 860, microphone 870, and camera 850.

Control processing circuit 910 also interfaces with the several internal functional components of the LASRS, such as the access door control device 940, tote ID sensor device 960, and the conveyor drive system 950. In addition to providing commands and/or control signals to the conveyor drive 950 and access door control device, control circuit 910 may also receive feedback signals from the these devices in some embodiments.

Finally, control processing circuit 910 communicates with remote systems via communication network interface circuit 970. This communication may be carried out over wired systems (e.g., via DSL, cable modem technology, or conventional phone lines) or wireless systems (e.g., Wi-FI or cellular data systems). Network interface circuit 970 may also provide connectivity to LSP personnel devices over short-range connections, using technology such as Wi-FI, Bluetooth communications links, or the like.

The preceding discussion should make it clear that there are many possible configurations for a LASRS. FIG. 2 illustrated an example LASRS having a two-level conveyor system, while FIGS. 3, 4, and 5 illustrated details of several possible configurations for the conveyor system. Other alternatives are possible, of course, including, for example, an LASRS having a conveyor system with more than two levels.

Figure 10:
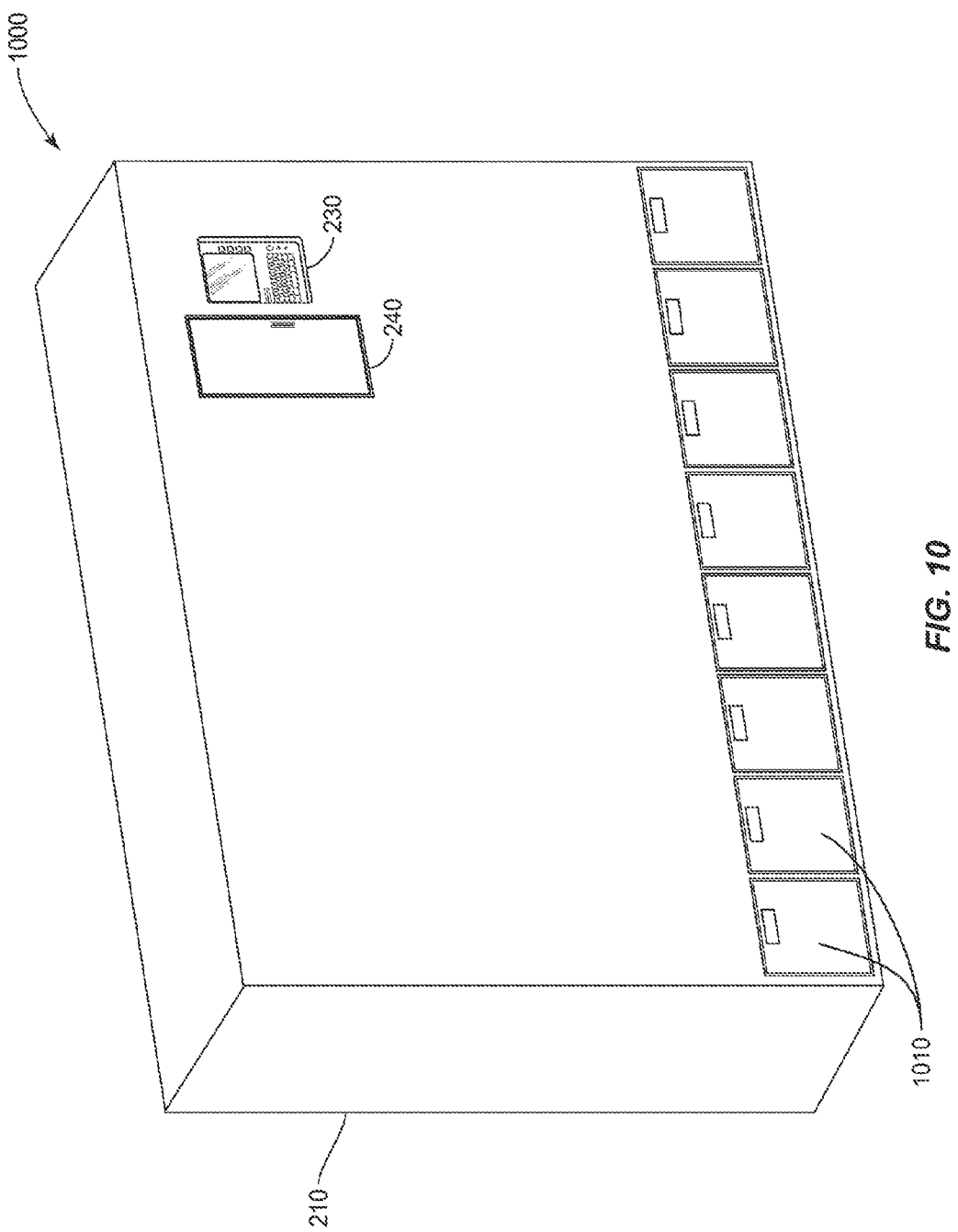
FIG. 10 is a perspective view of another example LASRS.

For instance, it may be desirable in some systems to separate the drop-off and pick-up systems. An example of this approach is illustrated in FIG. 10, where LASRS 1000 includes several drawers 1010, which can be used by consumers to drop off apparel for cleaning or other servicing. In this system, when the apparel is returned to the LASRS 1000 by service personnel, it is stored in a multi-layer storage and conveyor system, e.g., according to a system like those pictured in FIGS. 2-5. Thus, the apparel can be retrieved by the consumer using the external door 240 and human-interface system 230, as described earlier. In this example, the human-interface system 230 may also be used to control access to the drawers 1010 for consumer drop-offs, and to collect the necessary information to allow the dropped off items to be properly identified and serviced.

While FIG. 10 illustrates a set of statically configured drawers 1010, it should be appreciated that other possibilities for the configuration of a drop-off/storage system are possible. One approach, for example, is to adapt a multi-level conveyor system, using drop-off totes that are differently sized than those used to store returned apparel.

While some applications of the LASRS may justify a non-reconfigurable configuration, i.e., a physical configuration that is fixed by design, other LASRS may be designed for modularity and expandability. The LASRS is designed to be modular and expandable. For instance, some LASRS are designed for modular expansion in the horizontal dimension, i.e., by extending the horizontal travel length of the conveyor system, while others are designed for modular expansion in the vertical dimension, by adding additional horizontal layers. Still other LASRS may be designed to permit expansion in both the horizontal and vertical dimensions.

Expansion in the horizontal dimension is done by segmenting moving and static components of the multi-layer conveyor system, providing joining interfaces where the segments can be fastened to adjacent segments to allow continuity, much like how modular homes, garage door tracks, etc., are created. In these systems, the separable end sections are unique, because they contain the torque sources and portions of the conveyor that transition tote motion from horizontal to vertical to horizontal. That is, these end sections contain the "return" portions of the conveyor. An expandable LASRS unit may comprise one or several middle sections, between the separable end section, as these middle sections simply serve to join the end sections together with horizontal segments. Each middle section contains guides, bearings and conveyor segments that, when joined to the guides, bearings and conveyor segments in adjacent sections and in the end sections, create a continuous horizontal path for the conveyor and the totes that the conveyor moves. With this expandable design, a minimally sized LASRS might include two end sections and one middle section. Alternatively, one or both of the end sections may include a horizontal segment of substantial length, in which case a minimally sized LASRS includes only the two end sections, one or both of which include a horizontal segment. In either case, if a larger LASRS is desired, one or more additional middle sections may be attached between the end sections. Accordingly, in several embodiments of the invention, an LASRS includes at least two separable sections disposed side-by-side one another, such that the two separable sections are configured, when separated, to connect to a third separable section disposed between the two separable sections for adding additional storage positions on each of the layers of the conveyor system.

Expansion of a modular LASRS in the vertical direction is done by increasing the height of the return (horizontal-to-vertical down) conveyor section and adding a horizontal-to-vertical-up section for each layer at one end, an additional horizontal-to-vertical-up section internally, a short horizontal-left conveyor section, and a horizontal-left conveyor section for each vertical layer, in such a way as to ensure continuity of the tote path.

Figure 11:
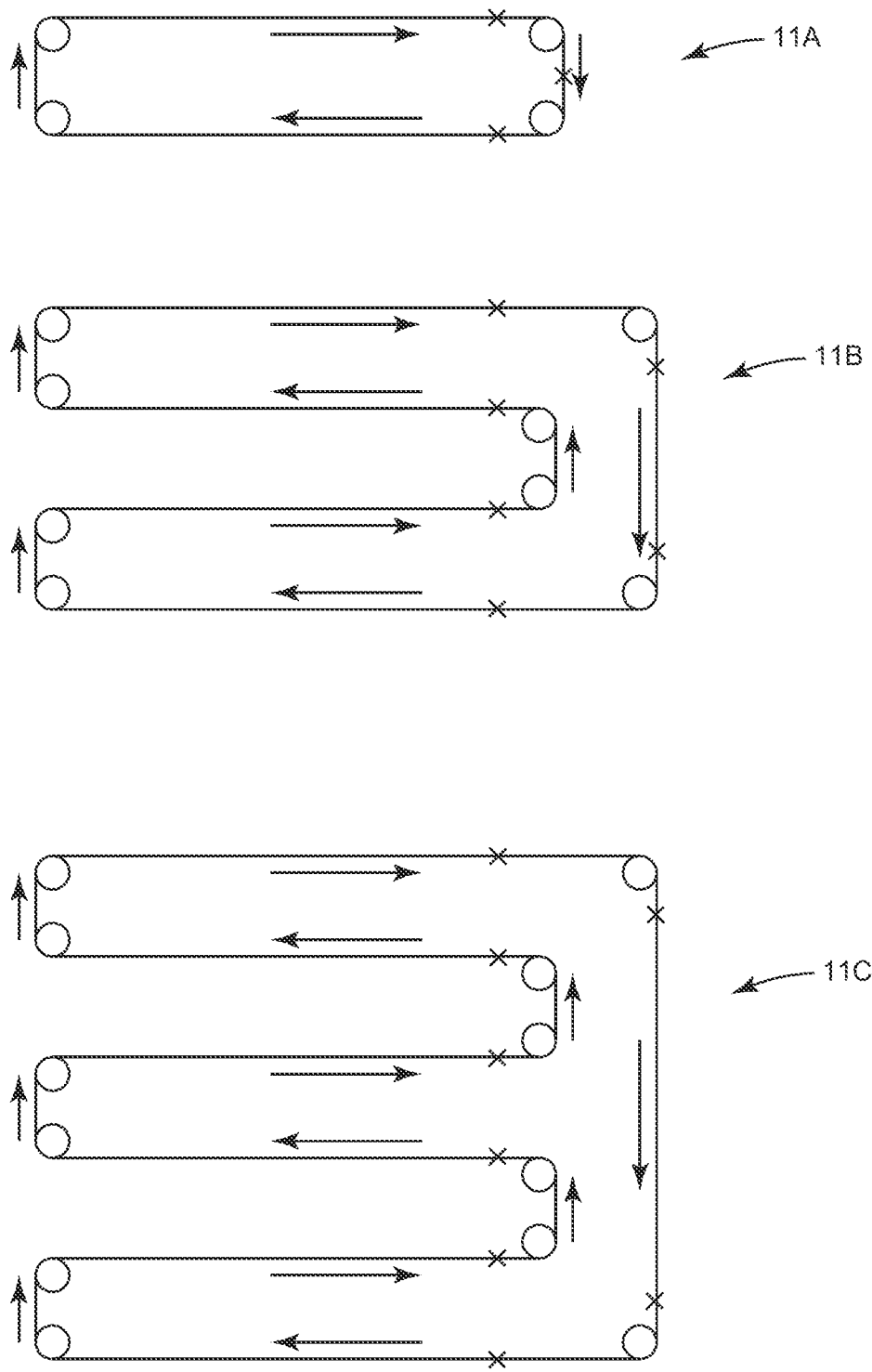
FIG. 11 illustrates vertical expansion of an LASRS, according to some embodiments of the invention.

FIG. 11 illustrates how a two-layer LASRS conveyor system (11A) can be converted to a four-layer LASRS conveyor system (11B), and to a six-layer LASRS conveyor system (11C). This pattern can be continued as layers are added. Note that the "X" markings in the figure illustrate the locations at which the modular system can be separated, according to one example. Accordingly, in some embodiments of the present invention, the conveyor system includes a first separable section connected to and disposed above a second separable section, wherein the first and second sections are each configured, when separated, to connect to a third separable section disposed between the two separable sections for adding a third layer of storage positions.

As suggested earlier, another area of design flexibility with respect to the LASRS is in the design of the tote propulsion system, including with respect to coupling one or more torque sources to the system. In the system illustrated in FIG. 3, for example, the conveyor system includes only a single motor 330, coupled to a vertical tote propulsion means. In that system, two vertical tote propulsion mechanisms and two horizontal tote propulsions mechanisms are coupled to one another. Thus, in embodiments like that pictured in FIG. 3, a single motor is configured to simultaneously drive horizontal tote propulsion means for each of the first and second layers and to simultaneously drive a first vertical tote propulsion means conveying totes from the first layer to the second layer and a second vertical tote propulsion means conveying totes from the second layer to the first layer.

Other configurations are possible. For instance, it is possible to have one torque source drive only the horizontal and vertical-up segments of the conveyor, with a second torque source or a friction-creating source to manage the vertical-down segment. Gravity does not help the horizontal or vertical-up segments, whereas it does help totes descend from the upper horizontal segment to the lower horizontal segment. That is, gravity would enable a tote to fall once it leaves the upper horizontal segment. If this descent is not controlled, totes could fall on top of each other, causing congestion and a failure of the conveyor in general.

If a single torque source is used to drive all conveyor segments, gravity could enable the tote to free fall a short distance from the end of the upper horizontal conveyor segment to the top of the closest drag point on the vertical-down conveyor segment just below the tote. This could cause a jarring effect on the conveyor if the free-falling totes build up enough speed before they are arrested by the vertical-down conveyor segments. A way to remedy this is to de-couple the vertical-down segment from the horizontal and vertical-up segments, allow totes to engage the vertical-down segment at a drag point as they transition from the upper horizontal segment, and integrate a damping element that counters the torque and limits the speed at which a tote may descend with the help of or in opposition to gravity. In some embodiments, for example, the damping element may be a constant-velocity motor, dedicated to the vertical-down segment, which limits the speed of a tote's descent no matter the torque (to a reasonable limit). The constant-velocity can be activated only when a tote is transitioned to the vertical-down segment from the upper horizontal segment. For example, the motor can be activated by the use of a proximity sensor, or by detecting the torque imposed on the motor (by the transitioning tote driving it through its engagement with the vertical-down conveyor segment), or other means. Another damping element may be a clutch that puts an upper limit on the speed at which the pulleys for the vertical-down conveyor segment may rotate. Yet another damping element may be comprised of mechanically resistive material embedded into the track, which slows the passing tote.

An important benefit of the LASRS is its environmental friendliness. The LASRS will provide significant environmental advantages over LSP drop-off stores and courier options. Widespread deployment of LASRS can reduce the national annual carbon footprint of LSPs by 47,000 metric tons.

This environmental friendliness is due to several factors. First, compared to conveyor alternatives and LSP drop-off stores, LASRS's are significantly more energy efficient. One reason is that LASRS units require less climate-controlled floor space for garment storage than other garment conveyor systems. Because it stores garments in horizontal and vertical layers, the LASRS requires less than half the floor space that conveyors in LSP drop-off stores consume. Consequently, the LASRS will save approximately 50% of the power required to maintain garments at room temperature. Another reason is that the LASRS approach more generally requires less climate-controlled physical space than conventional LSP retail drop-off stores. The LASRS does not require the continuous presence of human operators, nor the overhead associated with human operators including restrooms, furniture, fixtures and equipment. Retail space is typically modular, and often 7- to 10-times greater than the space required for the LASRS. Consequently, the LASRS will save between 86% and 90% of the power required to maintain the garments at room temperature.

Another environmental contribution from deployment of LASRS units is significantly shorter courier commutes. For example, couriers that provide home and work-place pick-up and delivery may visit fifteen locations each day, or approximately 13 miles/day. However, with widespread availability of the LASRS alternative, it is estimated that 50% of consumers would cease to use couriers, conserving approximately 6.5 miles per day. When multiplied by 32,000 LSPs, this alone could conserve more than 200,000 travel miles each day. Assuming the average courier vehicle averages 20 mpg, this reduces the annual national LSP carbon footprint by about 26,000 metric tons.

LASRS units can also contribute to significantly lower consumer commutes to access laundry service. If the LASRS's are in highly convenient locations, consumers will not need to drive additional distances to drop-off or pick-up their garments. In fact, their total miles traveled in comparison to non-courier drop-off and pick-up is estimated to be 10% less if the LASRS's are in these highly-convenient locations. If an average LSP receives thirty walk-in/drive-up customers each day, and those customers drive an average of 2.2 miles trip to errand destinations, each LSP could reduce the consumer mileage burden by 6 miles/day by employing an LASRS. If there are 32,000 LSPs in the country, this could conserve more than 200,000 miles each day. Assuming the average consumer vehicle averages 25 mpg, this reduces the annual national LSP carbon footprint by about 21,000 metric tons.

Still another contribution of the LASRS is improved consumer access to eco-friendly LSPs, thus decreasing reliance on toxic LSPs. Dry cleaning involves the use of a solvent other than water to lift dirt and stains off fabrics. The solvent perchloroethylene, often referred to as simply "perc," has dominated the field in the United States since the late 1930s, when Dow Chemical and other manufacturers introduced it as a replacement for the odiferous and flammable hydrocarbon solvents that were then commonly used. However, years of careless handling of spent perc and used filters have given rise to contaminated lots and a bad name for perc among many regulators and landowners. In addition, perc is considered a possible carcinogen by the Environmental Protection Agency, which runs a program to encourage the development of alternative solvents. In response, enterprising chemical companies have stepped up with a host of alternative solvents, including liquid carbon dioxide, silicones, propylene glycol ethers, and improved hydrocarbons. These products are marketed as having perc's cleaning power without the environmental baggage that the chlorinated solvent is perceived as bringing.

As many as 32,000 dry cleaning establishments operate in the U.S. today, and approximately 80% of these stores rely on perc. Industry observers say most of the rest use hydrocarbons such as ExxonMobil Chemical's DF-2000 and Chevron Phillips Chemical's EcoSoly. About 500 stores use a silicone-based system sold by Green Earth Cleaning, and fewer than 75 use CO2-based systems like Washpoint, a CO2/detergent package marketed by Linde and Uniqema. Less common still are the relatively new propylene glycol ether systems marketed as Impress by Lyondell Chemical and Rynex by Rynex Holdings.

With fewer than 20% of dry-cleaners offering non-perc services, odds are that eco-friendly dry cleaners are not convenient to most consumers. However, if the LASRS brought eco-friendly LSPs to the consumer, it would significantly increase access. It would also significantly reduce the overall use, contamination and associated costs of commonly used toxic substances.

In addition to the environmental impact described above, widespread use of LASRS units will also provide significant safety and liability benefits. These benefits accrue to both consumers and LSP personnel.

In addition to the possibility of damaging or misplacing garments in the plant, LSPs assume risks to their employees, clients and the garments they are to transport to and from plants. First, couriers that drive into residential areas are exposed to risks that could be significantly minimized, if not eliminated, by the LASRS alternative. One of these risks is robbery: as with any vehicle courier, particularly those in unfamiliar areas, there is the risk of being robbed for money, the vehicle, etc. Assault, whether independent or related to robbery is another significant possibility for drivers.

Another risk arising from courier services that is reduced by the LASRS alternative is the risk from extortion and exploitation. These risks cross all classes, and the fact that couriers are on a residential property (usually when the clients are not at home) sets couriers up for false or frivolous claims. Claims may include theft, property damage, harm to pets, creating a nuisance, etc. The harm from such claims could devastate personal and business reputations. (Euphemistically, the cleaners could get "taken to the cleaners.")

Another potential liability for LSPs operating a courier service is that there is generally no formal screening, licensing or tracking process for LSP couriers. Criminals exist in every social category, so one need not stereotype or profile. Crimes are a result of intent and opportunity, and if couriers were not needed due to the LASRS alternative, the opportunity element disappears. Obviously, the types of potential crimes include but are not limited to theft, property damage, assault, rape, murder, harm to pets, creating a nuisance, etc. There are many victims from these types of crimes. And the crimes need not occur when the courier is on his/her routes; they could result from surveillance performed during pick-up or drop-off, and they could be perpetuated by associates of the couriers.

In addition to reducing risks and liability for LSPs and their personnel, the LASRS approach offers consumers several safety benefits. With the LASRS alternative, many people will prefer to avoid home courier service partly due to safety concerns. As noted above, LSP drivers generally are not certified or traceable, unlike USPS, FedEx or UPS couriers. Consumer risks from courier services include, for example, the risk of stolen garments. Garments are left for couriers, typically stored in brightly-colored garment bags, hung in an accessible location. This obviously creates an opportunity for criminals (that may not necessarily be the courier) interested in augmenting their personal wardrobe and/or obtaining clothes that can be sold. Further, the consumer is also exposed to risks of burglary, robbery, assault, liability for injuries to couriers, and/or to frivolous liability claims.

To the extent that LASRS units can actually reduce the number of LSP retail outlets, or their operating hours, there are related reductions in risks to LSP drop-off store employees. Stores are often open early in the morning through evening hours. And, for the vast majority of stores, there is typically only one employee. This poses a serious security risk, even if the store is equipped with alarms and surveillance cameras, the risks including employee exposure to robbery, assault, and the like.

Those skilled in the art will appreciate that the foregoing description and the accompanying drawings represent non-limiting examples of a storage unit for the drop-off, delivery, and pick-up of personal garments. As such, the inventive apparatus and techniques taught herein are not limited by the foregoing description and accompanying drawings. Instead, the present invention is limited only by the following claims and their legal equivalents.

What is claimed is:

1. A storage unit for the drop-off, delivery, and pick-up of personal garments, the storage unit comprising:
    a plurality of apparel totes, each sized to enclose a plurality of apparel items on hangers, each including a machine-readable medium carrying a tote identifier code, and each configured with an access panel to allow deposit and retrieval of apparel items on hangers;
    a multi-layer conveyor system configured to selectively move apparel totes to and from a pre-defined customer access position and to and from a plurality of storage positions on each of at least first and second substantially horizontal storage layers, wherein the second storage layer substantially overlays the first storage layer;
    a housing containing the multi-layer conveyor system and the plurality of apparel totes and including a tote access mechanism, wherein the tote access mechanism is proximate to the pre-defined customer access position and is configured to securely retain the apparel totes within the housing while allowing customer access from outside the housing to contents of a single one of the apparel totes at a time;
    a human-interface system accessible from outside the housing and comprising at least one input device configured to receive customer input and at least one output device configured to provide transaction feedback;
    a sensor device configured to read the tote identifier code from the machine-readable medium for each apparel tote; and
    a control processor disposed within the housing, operatively connected to the human-interface system to collect the customer input and to produce the transaction feedback and operatively connected to the sensor device to collect the tote identifier codes, wherein the control processor is configured to track the position of each apparel tote based on the identifier codes and to control the multi-layer conveyor system responsive to the customer input.

2. The storage unit of claim 1, wherein the conveyor system comprises two separable sections disposed side-by-side one another, and wherein the two separable sections are each configured, when separated, to connect to a third separable section disposed between the two separable sections for adding additional storage positions on each of the first and second layers.

3. The storage unit of claim 1, wherein the conveyor system comprises a first separable section connected to and disposed above a second separable section, and wherein the first and second sections are each configured, when separated, to connect to a third separable section disposed between the two separable sections for adding a third layer of storage positions.

4. The storage unit of claim 1, wherein a single motor is configured to simultaneously drive horizontal tote propulsion means for each of the first and second layers and to simultaneously drive a first vertical tote propulsion means conveying totes from the first layer to the second layer and a second vertical tote propulsion means conveying totes from the second layer to the first layer.

5. The storage unit of claim 4, wherein the single motor is coupled to the horizontal tote propulsion means at a first gearing ratio so as to move totes horizontally at a first speed and coupled to the first and second vertical tote propulsion means at a second gearing ratio so as to move totes vertically at a second speed, wherein the ratio of the second speed to the first speed exceeds the ratio between each tote's dimensions in the directions of vertical and horizontal motion, respectively.

6. The storage unit of claim 1, wherein the machine-readable medium comprises one of the following:
    a printed bar-code on an external surface of the apparel tote;
    an RFID chip secured to or embedded within the apparel tote;
    a unique image disposed on an external surface of the apparel tote;
    a radio-linked microprocessor circuit; and
    one or more electrical contacts accessible from the exterior of the apparel tote and electrically connected to a processor or a mechanically configurable electrical switch or an electrically programmable memory device.

7. The storage unit of claim 1, wherein each apparel tote has a height, width, and depth, the width corresponding to a horizontal direction of motion in the multi-layer conveyor system and wherein the plurality of apparel totes comprises one or more first apparel totes having a first width and one or more second apparel totes having a second width.

8. The storage unit of claim 1, wherein each apparel tote includes a compliant interface component for engaging the conveyor system, the compliant interface component comprising at least one of the following:
    a high-friction surface disposed on the apparel tote to engage belts on the conveyor system;
    a clutch-enabled sprocket for engaging a chain drive on the conveyor system;
    a clutch-enabled gear for engaging a screw drive on the conveyor system; and
    a plurality of rolling rods disposed on the apparel tote to engage belts on the conveyor.

9. The storage unit of claim 1, wherein one or more of the apparel totes comprises a power interface to couple electrical power supplied from the exterior of the apparel totes to one or more electrical components secured within or embedded within the apparel tote.

10. The storage unit of claim 9, wherein the one or more electrical components comprises at least one of the following:
    a ventilation fan;
    a cooling system;
    a heating system;
    a contents-detection device;
    one or more environmental sensor devices;
    a programmable memory system.

11. The storage unit of claim 1, wherein the human interface system comprises an audio recording device configured to record voice messages from a customer or an audio/video recording device configured to record audio/video messages from a customer.

12. The storage unit of claim 1, further comprising a communications interface circuit operably connected to the control processor, wherein the control processor is configured to transmit at least a portion of the customer input to a remote station via the communications interface circuit.

13. The storage unit of claim 12, wherein the control processor and the communications interface circuit are configured to provide a real-time, two-way audio connection to the remote station via the communications interface circuit, responsive to the customer input.

14. A storage unit for the drop-off, delivery, and pick-up of personal apparel, the storage unit comprising:
   a plurality of apparel totes, each sized to enclose a plurality of apparel items on hangers;
   a multi-layer conveyor system configured to selectively move apparel totes to and from a pre-defined customer access position and to and from a plurality of storage positions on each of at least first and second storage layers;
   a housing containing the multi-layer conveyor system and the plurality of apparel totes and including a tote access mechanism, wherein the tote access mechanism is proximate to the pre-defined customer access position and is configured to allow customer access to a single one of the apparel totes at a time while securely retaining the apparel tote within the housing;
   a human-interface system accessible from outside the housing and comprising at least one input device configured to receive customer input and at least one output device configured to provide transaction feedback;
   a communications interface circuit; and
   a control processor disposed within the housing, operatively connected to the human-interface system to collect the customer input and to produce the transaction feedback and configured to control the multi-layer conveyor system responsive to the customer input, wherein the control processor is further configured to provide a real-time, two-way audio connection between the human-interface system and the remote station via the communications interface circuit, responsive to the customer input.

* * * * *